United States Patent
Mahmoud et al.

(10) Patent No.: US 12,182,621 B2
(45) Date of Patent: Dec. 31, 2024

(54) SYSTEM AND METHOD FOR USING SPARSITY TO ACCELERATE DEEP LEARNING NETWORKS

(71) Applicant: THE GOVERNING COUNCIL OF THE UNIVERSITY OF TORONTO, Toronto (CA)

(72) Inventors: Mostafa Mahmoud, Toronto (CA); Andreas Moshovos, North York (CA)

(73) Assignee: THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 0 days.

(21) Appl. No.: 18/005,725

(22) PCT Filed: Jul. 16, 2021

(86) PCT No.: PCT/CA2021/050989
§ 371 (c)(1),
(2) Date: Jan. 17, 2023

(87) PCT Pub. No.: WO2022/016257
PCT Pub. Date: Jan. 27, 2022

(65) Prior Publication Data
US 2023/0273828 A1    Aug. 31, 2023

Related U.S. Application Data

(60) Provisional application No. 63/054,498, filed on Jul. 21, 2020.

(51) Int. Cl.
*G06F 9/50* (2006.01)
*G06F 9/30* (2018.01)
*G06F 9/48* (2006.01)

(52) U.S. Cl.
CPC ........ *G06F 9/5027* (2013.01); *G06F 9/30036* (2013.01); *G06F 9/4881* (2013.01)

(58) Field of Classification Search
CPC .............................. G06F 9/4881; G06F 9/5027
See application file for complete search history.

(56) References Cited

U.S. PATENT DOCUMENTS

2018/0046900 A1*  2/2018  Dally ................... G06F 9/3001
2018/0046906 A1   2/2018  Dally et al.
(Continued)

OTHER PUBLICATIONS

International Search Report for PCT application No. PCT/CA2021/050989, dated Oct. 26, 2021.
(Continued)

*Primary Examiner* — Michael J Metzger
(74) *Attorney, Agent, or Firm* — Bhole IP Law; Anil Bhole; Marc Lampert

(57) ABSTRACT

A system and method for using sparsity to accelerate deep learning networks. The method includes: communicating a bit vector to a scheduler identifying which values in an input tensor are non-zero; for each lane of the input tensor, determining which values are to be communicated for multiply-accumulate (MAC) operations, the determination including directing performance of one of: communicating the current value in the lane; communicating the next value in the same lane where such value is non-zero; communicating a value from a step ahead in time where such value is non-zero; and communicating a value from a neighboring lane where such value is non-zero; and outputting the values of the MAC operations.

20 Claims, 20 Drawing Sheets

(56) References Cited

U.S. PATENT DOCUMENTS

| | | | |
|---|---|---|---|
| 2018/0121377 A1 | 5/2018 | Woo et al. | |
| 2019/0042542 A1 | 2/2019 | Narayanamoorthy et al. | |
| 2019/0205740 A1 | 7/2019 | Judd et al. | |
| 2019/0205746 A1 | 7/2019 | Nurvitadhi et al. | |
| 2020/0104692 A1 | 4/2020 | Hill et al. | |
| 2020/0160181 A1 | 5/2020 | Zlateski et al. | |
| 2021/0042875 A1* | 2/2021 | Meixner | G06F 8/443 |
| 2021/0256375 A1* | 8/2021 | Menick | G06N 3/084 |
| 2021/0334234 A1* | 10/2021 | Yudanov | G06F 9/5016 |
| 2022/0147826 A1* | 5/2022 | Xiao | G06N 3/082 |

OTHER PUBLICATIONS

Written opinion of the international searching authority for PCT application No. PCT/CA2021/050989, dated Oct. 26, 2021.
"Cacti: An integrated cache and memory access time, cycle time, area, leakage, and dynamic power model", HewlettPackard, https://github.com/HewlettPackard/cacti.
"DDR4 Power Calculator 4.0", Micron Technology, https://www.micron.com/_/media/documents/products/powercalculator/ddr4 power calc.xlsm.
"Design Compiler", Synopsys, http://www.synopsys.com/Tools/Implementation/RTLSynthesis/DesignCompiler/Pages, 2019.
"Innovus implementation system", Cadence, https://www.cadence.com/content/cadence-www/global/en US/home/tools/digital-design-andsignoff/hierarchical-design-and-floorplanning/innovus-implementationsystem.html.
"Training with mixed precision", NVIDIA, https://docs.nvidia.com/deeplearning/sdk/mixed-precision-training/index.html.
"Using bfloat16 with tensorflow models", Google, https://cloud.google.com/tpu/docs/bfloat16.
Bowman, Samuel R., et al., "A large annotated corpus for learning natural language inference", in Proceedings of the 2015 Conference on Empirical Methods in Natural Language Processing. Lisbon, Portugal: Association for Computational Linguistics, Sep. 2015. [Online]. Available: https://www.aclweb.org/anthology/D15-1075.
Burgess, John, et al., "RTX on—The NVIDIA Turing GPU", in 2019 IEEE Hot Chips 31 Symposium (HCS), Cupertino, CA, USA, Aug. 18-20, 2019, 2019. [Online]. Available: https://doi.org/10.1109/HOTCHIPS.2019.8875651.
Chen, Yunji, et al., "DaDianNao: A Machine-Learning Supercomputer", in Intl' Symp. on Microarchitecture, 2014. DOI: 10.1109/MICRO.2014.58.
Chen, Yu-Hsin, et al., "Eyeriss: A spatial architecture for energy-efficient dataflow for convolutional neural hetworks", in ACM SIGARCH Computer Architecture News, vol. 44, No. 3. IEEE Press, 2016. DOI: 10.1109/ISCA.2016.40.
Choi, Jungwook, et al., "Pact: Parameterized clipping activation for quantized neural networks", arXiv preprint arXiv:1805.06085, 2018.
Das, Dipankar, et al., "Mixed precision training of convolutional neural networks using integer operations", in 6th International Conference on Learning Representations, ICLR 2018, Vancouver, BC, Canada, Apr. 30-May 3, 2018, Conference Track Proceedings, 2018. [Online]. Available: https://openreview.net/forum?id=H135uzZ0—Available: arXiv: 1802.00930v2.
Dauphin, Yann N., et al., "Language modeling with gated convolutional networks", in Proceedings of the 34th International Conference on Machine Learning—vol. 70, ser. ICML'17. JMLR.org, 2017. [Online]. Available: http://dl.acm.org/citation.cfm?id=3305381.3305478.
De Sa, Christopher, et al., "High-accuracy low-precision training", arXiv preprint arXiv:1803.03383, 2018.
Dean, Jeffrey, et al., "Large scale distributed deep networks", in Advances in neural information processing systems, 2012.
Dean, Jeffrey, et al., "Large scale distributed deep networks", in Proceedings of the 25th International Conference on Neural Information Processing Systems—vol. 1, ser. NIPS'12. USA: Curran Associates Inc., 2012. [Online]. Available: http://dl:acm.org/citation:cfm?id=2999134:2999271.

Delmas Lascorz, Alberto, et al., "Bit-Tactical: A Software/Hardware Approach to Exploiting Value and Bit Sparsity in Neural Networks", in Proceedings of the Twenty-Fourth International Conference on Architectural Support for Programming Languages and Operating Systems, ser. ASPLOS '19. New York, NY, USA: ACM, 2019. [Online]. Available: http://doi.acm.org/10.1145/3297858.3304041.
Dettmers, Tim, et al., "Sparse networks from scratch: Faster training without losing performance", arXiv preprint arXiv:1907.04840, 2019.
Drumond, Mario, et al., "Training dnns with hybrid block floating point", in Proceedings of the 32nd International Conference on Neural Information Processing Systems, ser. NIPS'18. USA: Curran Associates Inc., 2018. [Online]. Available: http://dl.acm.org/citation.cfm?id=3326943.3326985.
Golub, Maximilian, et al., "Dropback: Continuous pruning during training", arXiv preprint arXiv:1806.06949, 2018.
Gondimalla, Ashish, et al., "Sparten: A sparse tensor accelerator for convolutional neural networks", in Proceedings of the 52nd Annual IEEE/ACM International Symposium on Microarchitecture, ser. MICRO '52. New York, NY, USA: ACM, 2019. [Online]. Available: http://doi.acm.org/10.1145/3352460.3358291.
Gupta, Udit, et al., "MASR: A Modular Accelerator for Sparse RNNs", in 28th International Conference on Parallel Architectures and Compilation Techniques, PACT 2019, Seattle, WA, USA, Sep. 23-26, 2019. IEEE, 2019. [Online]. Available: https://doi.org/10.1109/PACT.2019.00009.
He, Kaiming, et al., "Deep residual learning for image recognition", CoRR, vol. abs/1512.03385, 2015. [Online]. Available: http://arxiv.org/abs/1512.03385.
Hegde, Kartik, et al., "UCNN: Exploiting Computational Reuse in Deep Neural Networks via Weight Repetition", in Proceedings of the 45th Annual International Symposium on Computer Architecture, ser. ISCA '18. Piscataway, NJ, USA: IEEE Press, 2018. [Online]. Available: https://doi.org/10.1109/ISCA.2018.00062.
Huang, Gao, et al., "Densely connected convolutional networks", CoRR, vol. abs/1608.06993, 2016. [Online]. Available: http://arxiv.org/abs/1608.06993.
Iandola, Forrest N., et al., "SqueezeNet: AlexNet-level accuracy with 50x fewer parameters and <1mb model size", CoRR, vol. abs/1602.07360, 2016. [Online]. Available: http://arxiv.org/abs/1602.07360.
Jain, Animesh, et al., "Gist: Efficient data encoding for deep neural network training", in Proceedings of the 45th Annual International Symposium on Computer Architecture, ser. ISCA '18. Piscataway, NJ, USA: IEEE Press, 2018. [Online]. Available: https://doi.org/10.1109/ISCA.2018.00070.
Jouppi, Norman P., et al., "In-datacenter performance analysis of a tensor processing unit", in Proceedings of the 44th Annual International Symposium on Computer Architecture, ser. ISCA '17. New York, NY, USA: ACM, 2017. Online]. Available: http://doi:acm.org/10:1145/3079856:3080246.
Judd, Patrick, et al., "Cnvlutin2: Ineffectual-Activation-and-Weight-Free Deep Neural Network Computing", CoRR, vol. abs/1705.00125, 2017. [Online]. Available: http://arxiv.org/abs/1705.00125.
Kalamkar, Dhiraj D., et al., "A study of BFLOAT16 for deep learning training", CoRR, vol. abs/1905.12322, 2019. [Online]. Available: http://arxiv.org/abs/1905.12322.
Köster, Urs, et al., "Flexpoint: An adaptive numerical format for efficient training of deep neural networks", in Proceedings of the 31st International Conference on Neural Information Processing Systems, ser. NIPS'17. USA: Curran Associates Inc., 2017. [Online]. Available: http://dl.acm.org/citation.cfm?id=3294771.3294937.
Krizhevsky, Alex, et al., "ImageNet Classification with Deep Convolutional Neural Networks", Commun. ACM, vol. 60, May 2017. [Online]. Available: http://doi.acm.org/10.1145/3065386.
Li, Yuanfang, et al., "Caterpillar: Coarse grain reconfigurable architecture for accelerating the training of deep neural networks", 2017 IEEE 28th International Conference on Application-specific Systems, Architectures and Processors (ASAP), Jul. 2017. [Online]. Available: http://dx.doi.org/10.1109/ASAP.2017.7995252.

(56) References Cited

OTHER PUBLICATIONS

Liu, Shaoli, et al., "Cambricon: An instruction set architecture for neural networks", in 2016 IEEE/ACM Intl' Conf. on Computer Architecture (ISCA), 2016. DOI:10.1109/ISCA.2016.42.

Mayer, Ruben, et al., "Scalable deep learning on distributed infrastructures: Challenges, techniques and tools", CORR, vol. abs/1903.11314, 2019. [Online]. Available: http://arxiv:org/abs/1903:11314.

Merity, Stephen, et al., "Pointer sentinel mixture models", in 5th International Conference on Learning Representations, ICLR 2017, Toulon, France, Apr. 24-26, 2017, Conference Track Proceedings, 2017. [Online]. Available: https://openreview.net/forum?id=Byj72udxe.

Micikevicius, Paulius, et al., "Mixed precision training", in 6th International Conference on Learning Representations, ICLR 2018, Vancouver, BC, Canada, Apr. 30-May 3, 2018, Conference Track Proceedings, 2018. [Online]. Available: https://openreview.net/forum?id=r1gs9JgRZ.

Mostafa, Hesham, et al., "Parameter efficient training of deep convolutional neural networks by dynamic sparse reparameterization", in International Conference on Machine Learning, 2019.

Parashar, Angshuman, et al., "SCNN: an accelerator for compressed-sparse convolutional neural networks", in Intl' Symp. on Computer Architecture, ser. ISCA '17, 2017.

Prabhakar, Raghu, et al., "Plasticine: A reconfigurable architecture for parallel patterns", in 2017 ACM/IEEE 44th Annual International Symposium on Computer Architecture (ISCA), Jun. 2017.

Rahman, Rezaur, et al., "Intel Xeon Phi Coprocessor Architecture and Tools: The Guide for Application Developers", 1st ed. Berkely, CA, USA: Apress, 2013.

Rhu, Minsoo, et al., "Compressing dma engine: Leveraging activation sparsity for training deep neural networks", in 2018 IEEE International Symposium on High Performance Computer Architecture (HPCA). IEEE, 2018. DOI: 10.1109/HPCA.2018.00017.

Russakovsky, Olga, et al., "ImageNet Large Scale Visual Recognition Challenge", CoRR, vol. abs/1409.0575, Sep. 2014.

Schuiki, Fabian, et al., "A scalable near-memory architecture for training deep neural networks on large in-memory datasets", IEEE Transactions on Computers, vol. 68, Apr. 2019. DOI: 10.1109/TC.2018.2876312.

Simonyan, Karen, et al., "Very deep convolutional networks for large-scale image recognition", arXiv preprint arXiv:1409.1556, 2014.

Strubell, Emma, et al., "Energy and policy considerations for deep learning in NLP", CoRR, vol. abs/1906.02243, 2019. [Online]. Available: http://arxiv:org/abs/1906:02243.

Sun, Xu, et al., "meProp: Sparsified Back Propagation for Accelerated Deep Learning with Reduced Overfitting", in Proceedings of the 34th International Conference on Machine Learning—vol. 70, ser. ICML'17. JMLR.org, 2017. [Online]. Available: http://dl.acm.org/citation.cfm?id=3305890.3306022.

Venkataramani, Swagath, et al., "Scaledeep: A scalable compute architecture for learning and evaluating deep networks", in Proceedings of the 44th Annual International Symposium on Computer Architecture, ser. ISCA '17. New York, NY, USA: ACM, 2017. [Online]. Available: http://doi:acm.org/10:1145/3079856:3080244.

Mnyals, Oriol, et al., "Show and Tell: Lessons learned from the 2015 MSCOCO Image Captioning Challenge", CoRR, vol. abs/1609.06647, 2016. [Online]. Available: http://arxiv.org/abs/1609.06647.

Wang, Shibo, et al., "BFloat16: The secret to high performance on Cloud TPUs", 2019. [Online]. Available: https://cloud.google.com/blog/products/ai-machine-learning/bfloat16-the-secret-to-high-performance-on-cloud-tpus.

Wang, Naigang, et al., "Training deep neural networks with 8-bit floating point number", in Proceedings of the 32nd International Conference on Neural Information Processing Systems, ser. NIPS'18. USA: Curran Associates Inc., 2018. [Online]. Available: http://dl.acm.org/citation.cfm?id=3327757.3327866.

Wen, Wei, et al., "TernGrad: Ternary gradients to reduce communication in distributed deep learning", in Advances in Neural Information Processing Systems 30, Curran Associates, Inc., 2017, pp. 1509-1519. [Online]. Available: http://papers.nips.cc/paper/6749-terngrad-ternarygradients-to-reduce-communication-in-distributed-deep-learning.pdf.

Yang, Andrew, "Deep Learning Training At Scale Spring Crest Deep Learning Accelerator (Intel® Nervana™ NNP-T)", in 2019 IEEE Hot Chips 31 Symposium (HCS), Cupertino, CA, USA, Aug. 18-20, 2019, 2019. [Online]. Available: https://doi.org/10.1109/HOTCHIPS.2019.8875643.

Zhang, Shijin, et al., "Cambricon-X: An Accelerator for Sparse Neural Networks", in Intl' Symp. on Microarchitecture, 2016.

Zhang, Shijin, et al., "Cambricon-x: An accelerator for sparse neural networks", in Intl' Symp. on Microarchitecture, 2016. [Online]. Available: https://doi.org/10.1109/MICRO.2016.7783723.

Zhang, Jiaqi, et al., "Eager pruning: Algorithm and architecture support for fast training of deep neural networks", in Proceedings of the 46th International Symposium on Computer Architecture, ser. ISCA '19. New York, Ny, USA: Acm, 2019. [Online]. Available: http://doi.acm.org/10.1145/3307650.3322263.

Zhang, Dongqing, et al., "LQ-Nets: Learned Quantization for Highly Accurate and Compact Deep Neural Networks", in Proceedings of the European Conference on Computer Vision (ECCV), 2018.

Zhou, Xuda, et al., "Cambricon-S: addressing irregularity in sparse neural networks through a cooperative software/hardware approach", in Intl' Symp. on Microarchitecture, 2018. DOI: 10.1109/MICRO.2018.00011.

Extended European Search Report for application No. 21846058.2, EPO, search completed: Jun. 24, 2024, communication dated: Jun. 24, 2024.

Stuart, Dylan James Malone, "An Efficient Hardware Architecture for Exploiting Sparsity in Neural Networks", Nov. 1, 2019 (Nov. 1, 2019), XP093172433, Retrieved from the Internet: URL: https://tspace.library.utoronto.ca/bitstream/1807/98404/3/Stuart_Dylan_%20_201911_MAS_thesis.pdf.

\* cited by examiner

SYSTEM AND METHOD FOR USING SPARSITY TO ACCELERATE DEEP LEARNING NETWORKS

TECHNICAL FIELD

The following relates generally to deep learning networks and more specifically to a system and method for using sparsity to accelerate deep learning networks.

BACKGROUND

In previous times, neural networks could be trained on a commodity server within a few hours; however, in modern times, training the best neural networks has become an exascale class problem. State-of-the-art neural networks may require many graphics processors or specialized accelerators, such as the tensor processing unit (TPU), Gaudi, DaVinci, or Cerebras CS1 so that they can be trained within practical time limits. Tuning neural networks, for example, via hyperparameter exploration, or more generally via network architecture search, for best performance or accuracy during inference further exacerbates the cost of training. Beyond the cost of acquiring or getting access to such expensive computing resources, there are also the operating costs and the environmental impact of training. Training neural networks at the "edge" may be needed in certain applications, for example, to refine an existing model with user-specific information and input. While the trade offs for edge devices are different than those for data centers or desktop machines, the need remains the same: reduce execution time and improve energy efficiency under specific constraints.

SUMMARY

In an aspect, there is provided a method for using sparsity to accelerate deep learning networks for a processing element, the method comprising: receiving and storing an input tensor from each of a plurality of input streams; communicating a bit vector to a scheduler identifying which values in the input tensor are non-zero; for each lane of the input tensor, determining which values are to be communicated for multiply-accumulate (MAC) operations, the determination comprising directing performance of one of: communicating the current value in the lane; communicating the next value in the same lane where such value is non-zero; communicating a value from a step ahead in time where such value is non-zero; and communicating a value from a neighboring lane where such value is non-zero; communicating the directed values for MAC operation; and outputting the values of the MAC operations.

In a particular case of the method, the processing element is tiled together with a plurality of other processing elements, and receiving and storing the input tensor from each of the plurality of input streams comprises processing elements along a same row of the input streams share input and processing elements along a same column of the input streams share input.

In another case of the method, each processing unit of the plurality of processing units uses a separate scheduler.

In yet another case of the method, each processing unit along the same row uses a common scheduler.

In yet another case of the method, the lanes are treated as arranged in a ring where a last of the lanes is neighbouring a first of the lanes.

In yet another case of the method, communicating the value from the neighboring lane comprises communicating a value from a neighboring lane from a step ahead in time where such value is non-zero.

In yet another case of the method, receiving and storing the input tensor from each of the plurality of input streams comprises storing each of the input streams in a respective staging buffer.

In yet another case of the method, the staging buffer comprises a current step of the input stream and one or more steps ahead in time.

In yet another case of the method, the scheduler uses a hierarchical priority scheme.

In yet another case of the method, the hierarchical priority scheme comprises a dense schedule, followed by a plurality of steps increasingly ahead in time, and followed by a plurality of steps of neighbouring lanes increasingly ahead in time.

In another aspect, there is provided a system for using sparsity to accelerate deep learning networks, the system comprising one or more processing units in communication with data memory for executing processing elements (PEs), each processing element receiving a plurality of input streams and comprising: staging buffers for receiving and storing an input tensor from each of the plurality of input streams; a scheduler to receive a bit vector from each staging buffer to identify which values in the input tensor are non-zero, and, for each lane of the input tensor, the scheduler determines which values are to be communicated to a multiply-accumulate (MAC) unit for MAC operations, the determination comprising directing performance of one of: communicating the current value in the lane; communicating the next value in the same lane where such value is non-zero; communicating a value from a step ahead in time where such value is non-zero; and communicating a value from a neighboring lane where such value is non-zero; and performing and outputting the values of the MAC operations by the MAC unit.

In a particular case of the system, the processing elements are collectively arranged in a tiled arrangement where processing elements along a same row of the input streams share input and processing elements along a same column of the input streams share input.

In another case of the system, each processing unit uses a separate scheduler.

In yet another case of the system, each processing unit along the same row uses a common scheduler.

In yet another case of the system, the lanes are treated as arranged in a ring where a last of the lanes is neighbouring a first of the lanes.

In yet another case of the system, communicating the value from the neighboring lane comprises communicating a value from a neighboring lane from a step ahead in time where such value is non-zero.

In yet another case of the system, the staging buffer comprises a current step of the input stream and one or more steps ahead in time.

In yet another case of the system, the scheduler uses a hierarchical priority scheme.

In yet another case of the system, the hierarchical priority scheme comprises a dense schedule, followed by a plurality of steps increasingly ahead in time, and followed by a plurality of steps of neighbouring lanes increasingly ahead in time.

In yet another case of the system, the scheduler receives two bit vectors from each of the staging buffers associated with values in each lane, the two bit vectors are bit-wise OR-ed to generate an output bit vector indicating where there is at least one zero, the scheduler, using the values in the output bit vector, selects a movement per lane so that as many of the non-zero values as possible are processed in a single step.

These and other aspects are contemplated and described herein. It will be appreciated that the foregoing summary sets out representative aspects of embodiments to assist skilled readers in understanding the following detailed description.

DESCRIPTION OF THE DRAWINGS

A greater understanding of the embodiments will be had with reference to the Figures, in which.

DETAILED DESCRIPTION

Figure 1:
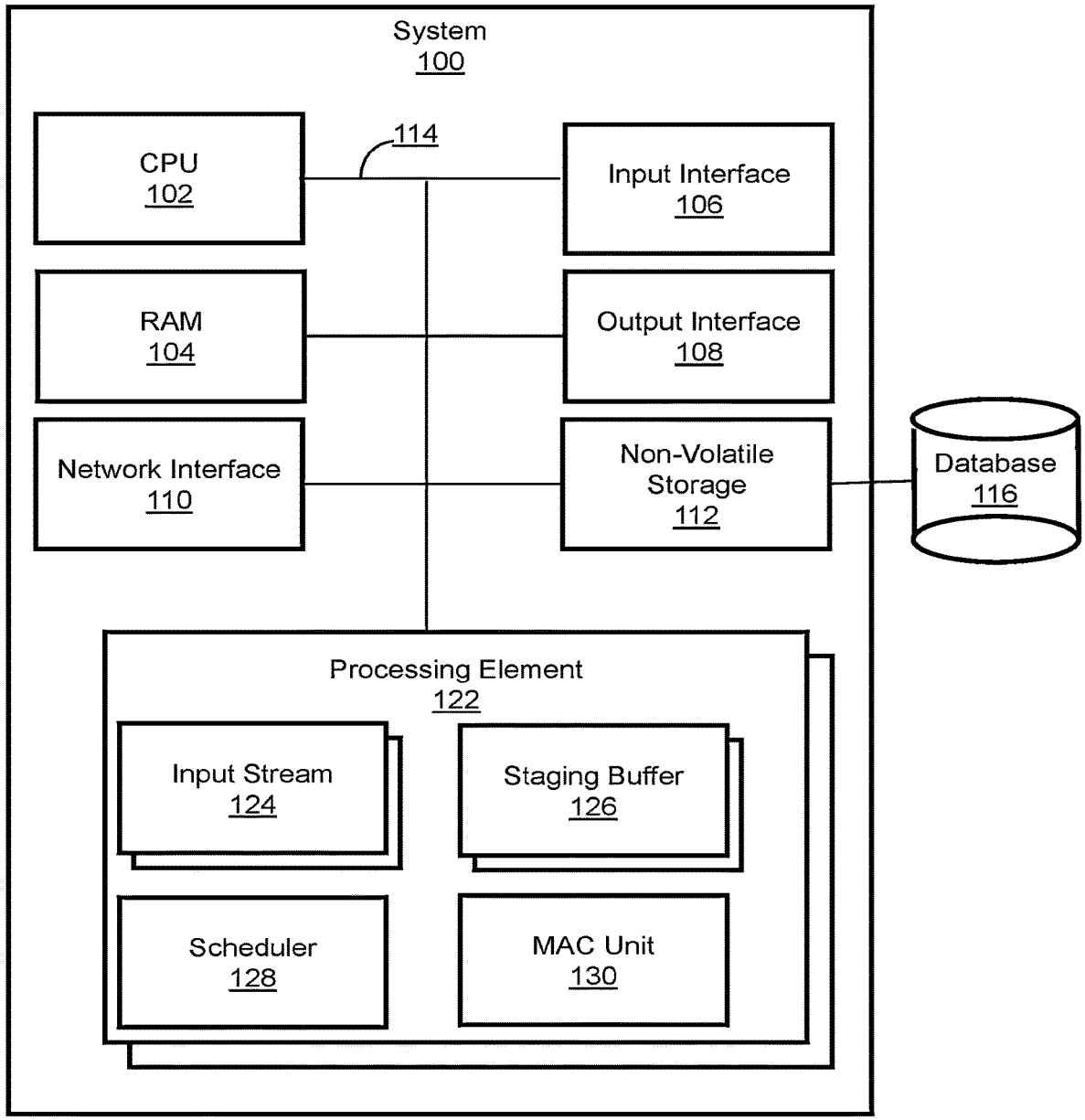
FIG. 1 is a schematic diagram of a system for using sparsity to accelerate deep learning networks, in accordance with an embodiment.

Embodiments will now be described with reference to the figures. For simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

Recently, there have been substantial efforts expended for ways to reduce execution time and energy cost of training. As an example, distributed training partitions the training workload across several computing nodes by exploiting model, data, and pipeline parallelism to reduce overall latency. Intra- and inter-node data blocking, reuse, and communication and computation overlapping can be used to orchestrate computing, memory hierarchy, and communication resources to improve performance and energy efficiency. Lossless and lossy compression can be used to reduce the footprint of the vast amounts of data processed during training. While originally training used single precision floating-point data and arithmetic, more compact datatypes reduce overall data volumes and computation costs (for example, half precision floating-point FP16, bfloat16, dynamic floating-point, and flexpoint). Mixed-datatype approaches can further reduce costs by performing many computations using lower cost representations and few using higher cost ones.

Regardless of the above approaches, training remains a substantial exascale class problem. The present inventors observed that during training many ineffectual computations occur naturally and for a variety of models. Accordingly, the present embodiments advantageously provide an approach for improving execution time and energy efficiency for training. The bulk of energy consumption during training is due to the transfers and computations needed to perform multiply-accumulate operations (MACs). Often, one of the operands in these MACs is zero, and hence these operations can be safely eliminated as they do not affect the values produced during training; and thus, convergence and final accuracy. For many artificial neural networks, many zeros naturally occur in the activations during the forward and backward passes, and in the gradients during the backward pass. When sparsity exists, it represents an opportunity for improving performance and energy efficiency.

Zero values and ineffectual operations also occur during inference, both in weights and activations. While some zero weights appear naturally, their occurrence can be greatly amplified through pruning. Zero activations also occur naturally during inference and are most frequent in models that use the Rectifier Linear Unit (ReLU) activation function. Thus, the presence of zeros can be exploited, which is referred to as sparsity. Some approaches target sparsity in the weights, and some target sparsity in both activations and weights.

However, exploiting sparsity during training is substantially more technically challenging than it is for inference. First, just because zeros occur during inference does not imply they should also appear during training. Training generally starts with some random initialization of the weights, and proceeds to slowly adjust them until the network converges. Eventually, some of the weights will become zeros, but how fast this will occur is not known; neither is whether they will stay at zero. Second, the position of zero weights during inference is known and does not change, hence the sparsity pattern is static. As a result, for inference, the computation to best take advantage of the sparsity in weights can be pre-scheduled. This is not the case during training where the weight values keep changing; and hence, the sparsity pattern is dynamic. This pattern generally varies with every sample and batch in the training dataset and also varies over time. Third, inference involves two input tensors, the weights and the activations, which are used in only one computation; typically, a matrix-matrix multiplication or a matrix-vector multiplication. Thus, the two tensors can be laid out in memory in a way that serves a specific access pattern facilitating data parallel, and thus energy-efficient, fetching and execution. During training, there is generally a third tensor, the gradients, and each of the three tensors is used in two different computations. Particularly challenging is that the way a tensor is used in each of those two computations may be different. For example, during the forward pass, a different set of weights may contribute to an output than those during the backward pass. This makes it hard to layout the values in memory in a way that fits both computation needs; a layout that fits the forward has to be "transposed" for the backward. Fourth, most inference accelerators that exploit sparsity operate on fixed-point values, whereas training typically requires floating point values. The relative costs of operations are different and may result in different trade-offs.

When sparsity exists, it represents an opportunity for improving performance and energy efficiency. To exploit this opportunity, the present embodiments improve performance and energy efficiency when sparsity exists, and also avoid substantially hurting performance and energy efficiency otherwise. The present embodiments (which can be informally referred to as "TensorDash") provide a run-time approach to eliminate ineffectual MACs using a combination of an inexpensive hardware scheduler and a co-designed sparse, low-cost data interconnect that are placed just in front of the MAC units. The present embodiments can work with 'out-of-the-box' neural networks and require no modification nor any special annotations from the model developer. The present embodiments do not change the values nor the functional units; and thus, does not affect convergence nor accuracy.

In some cases, the present embodiments gain additional benefits from network pruning and quantization during training. Generally, the goal of pruning is to convert weight values to zero. Dynamic sparse reparameterization, sparse momentum, eager pruning, and DropBack are training-time pruning methods that can achieve high sparsity levels with minimal or no effects on output accuracy. The present inventors examined the interaction of the present embodiments with some of these methods. Generally, the goal of quantization is to reduce the data width that will be used during inference. During training, quantization effectively clips what would otherwise be values of low magnitude into zeros. Quantization methods include PACT (Parameterized Clipping Activation for Quantized Neural Networks) and LQ-Nets (Learned Quantization-Nets). The present embodiments can also benefit selective backpropagation methods which backpropagate loss only for some of the neurons. In some cases, selective backpropagation manifests as sparsity as it effectively converts a large number of gradients into zeros.

Advantageously, the embodiments described herein provide at least the following functionality and benefits:

Exploits naturally occurring sparsity during training which appears predominantly in the activations and the gradients. Sparsity is exploited dynamically and, in most cases, completely in hardware using a low-overhead hardware scheduler to advance MAC operations in time (earlier cycle) and space (another MAC unit) so that overall computation finishes earlier. The scheduler makes no assumptions about how sparsity is distributed so that it can efficiently handle the dynamic sparsity patterns that arise during training.

Does not affect numerical fidelity as it only eliminates MAC operations where at least one of the inputs is zero.

Compatible with data-parallel processing elements that perform multiple MAC operations accumulating into a single output and is compatible with any dataflow for such processing elements.

Advantages can be amplified with training algorithms that incorporate quantization or pruning.

Can be configured to extract sparsity in one or both operands.

For clarity of illustration, the present disclosure is generally directed to convolutional layers as their dataflow is more challenging than other layers due to the use of activation windows. However, it is understood that the embodiments described herein can be applied to any suitable layer; for example, pooling layers and fully-connected layers. During training, processing a layer i generally comprises three main convolutions or operations:

$$\text{forward pass: } Ar_{i+1} = W_i \cdot A_i \quad (1)$$

$$\text{backward pass: } G_{i-1} = G_i \cdot W_i \quad (2)$$

$$\text{backward pass: } Gw_i = G_i \cdot A_i \quad (3)$$

where $W_i$ are the weights, $A_i$ are the input activations, $A_{i+1}$ are the output activations, $G_{i-1}$ are the input activation gradients, $G_i$ are the output activation gradients, and $Gw_i$ are the weight gradients. The first convolution is performed during the forward pass to calculate the output activations of the layer while the next two convolutions are performed during the back-propagation pass to calculate the input gradients and the weight gradients respectively. It has been determined that activations, gradients, and/or weights of convolutional neural networks exhibit significant sparsity during training. The present embodiments advantageously exploit such sparsity to accelerate processing by eliminating corresponding multiply-accumulate (MAC) operations.

Figure 2:
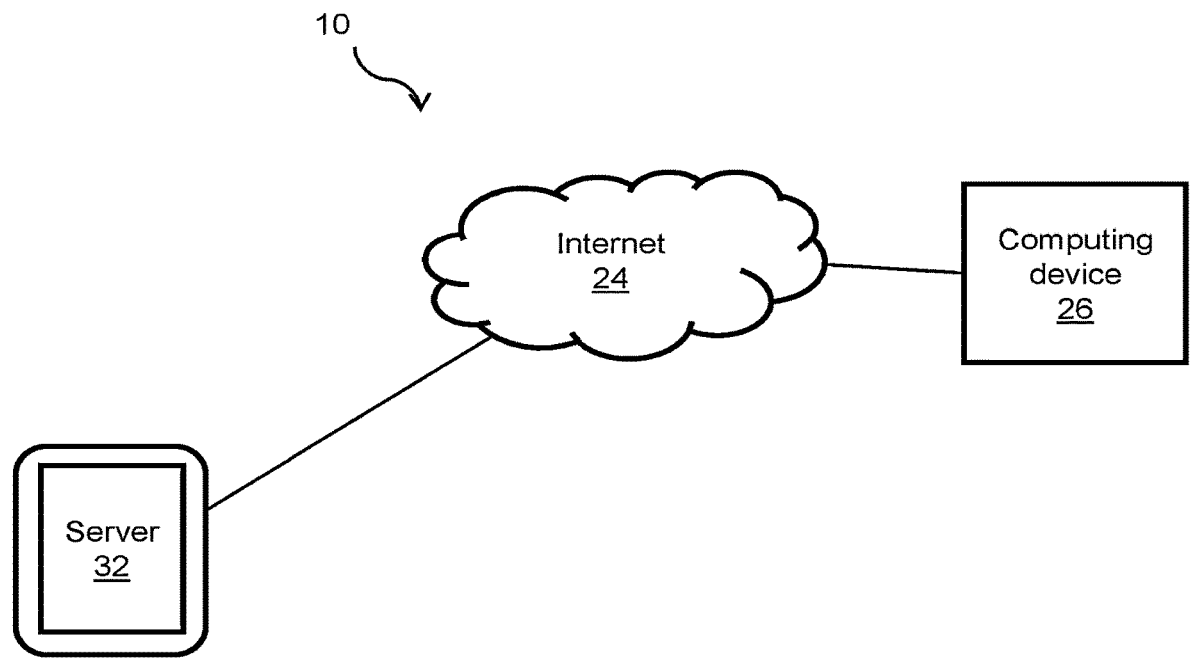
FIG. 2 is a schematic diagram showing the system of FIG. 1 and an exemplary operating environment.

Referring now to FIG. 1 and FIG. 2, a system 100 for using sparsity to accelerate deep learning networks (informally referred to as "TensorDash"), in accordance with an embodiment, is shown. In this embodiment, the system 100 is run on a computing device 26 and accesses content located on a server 32 over a network 24, such as the internet. In further embodiments, the system 100 can be run only on the device 26 or only on the server 32, or run and/or distributed on any other computing device; for example, a desktop computer, a laptop computer, a smartphone, a tablet computer, a server, a smartwatch, distributed or cloud computing device(s), or the like. In some embodiments, the components of the system 100 are stored by and executed on a single computer system. In other embodiments, the components of the system 100 are distributed among two or more computer systems that may be locally or remotely distributed.

FIG. 1 shows various physical and logical components of an embodiment of the system 100. As shown, the system 100 has a number of physical and logical components, including a processing unit 102 (comprising one or more processors), random access memory ("RAM") 104, an input interface 106, an output interface 108, a network interface 110, non-volatile storage 112, and a local bus 114 enabling processing unit 102 to communicate with the other components. The processing unit 102 can execute or direct execution of various modules, as described below in greater detail. RAM 104 provides relatively responsive volatile storage to the processing unit 102. The input interface 106 enables an administrator or user to provide input via an input device, for example a keyboard and mouse. The output interface 108 outputs information to output devices, for example, a display and/or speakers. The network interface 110 permits communication with other systems, such as other computing devices and servers remotely located from the system 100, such as for a typical cloud-based access model. Non-volatile storage 112 stores the operating system and programs, including computer-executable instructions for implementing the operating system and modules, as well as any data used by these services. Additional stored data, as described below, can be stored in a database 116. During operation of the system 100, an operating system, the modules, and the related data may be retrieved from the non-volatile storage 112 and placed in RAM 104 to facilitate execution.

In an embodiment, the system 100 includes one or more processing elements (PEs) 122. In some cases, the processing elements 122 can be tiled, as described herein. Each processing element 122 includes a number of modules, including a plurality of input streams 124 (including pads for the input stream), a plurality of staging buffers 126, a scheduler 128, and a MAC unit 130. In some cases, the MAC unit 130 can output to an output pad (C pad). In some cases, some of the modules can be run at least partially on dedicated on separate hardware, while in other cases, at least some of the functions of the some of the modules are executed on the processing unit 102.

While, in some cases, weights may exhibit negligible sparsity during training unless the training incorporates pruning, the present inventors determined that there is considerable sparsity in the activations and the output gradients. Thus, the sparsity of $A_i$ and $G_i$ in the first and the second convolutions, respectively, can be exploited. For the third convolution, sparsity in $G_i$ or $A_i$ can be exploited; for example, whichever is higher. In some cases, the present embodiments can exploit sparsity for both $G_i$ and $A_i$ simultaneously.

Figure 4:
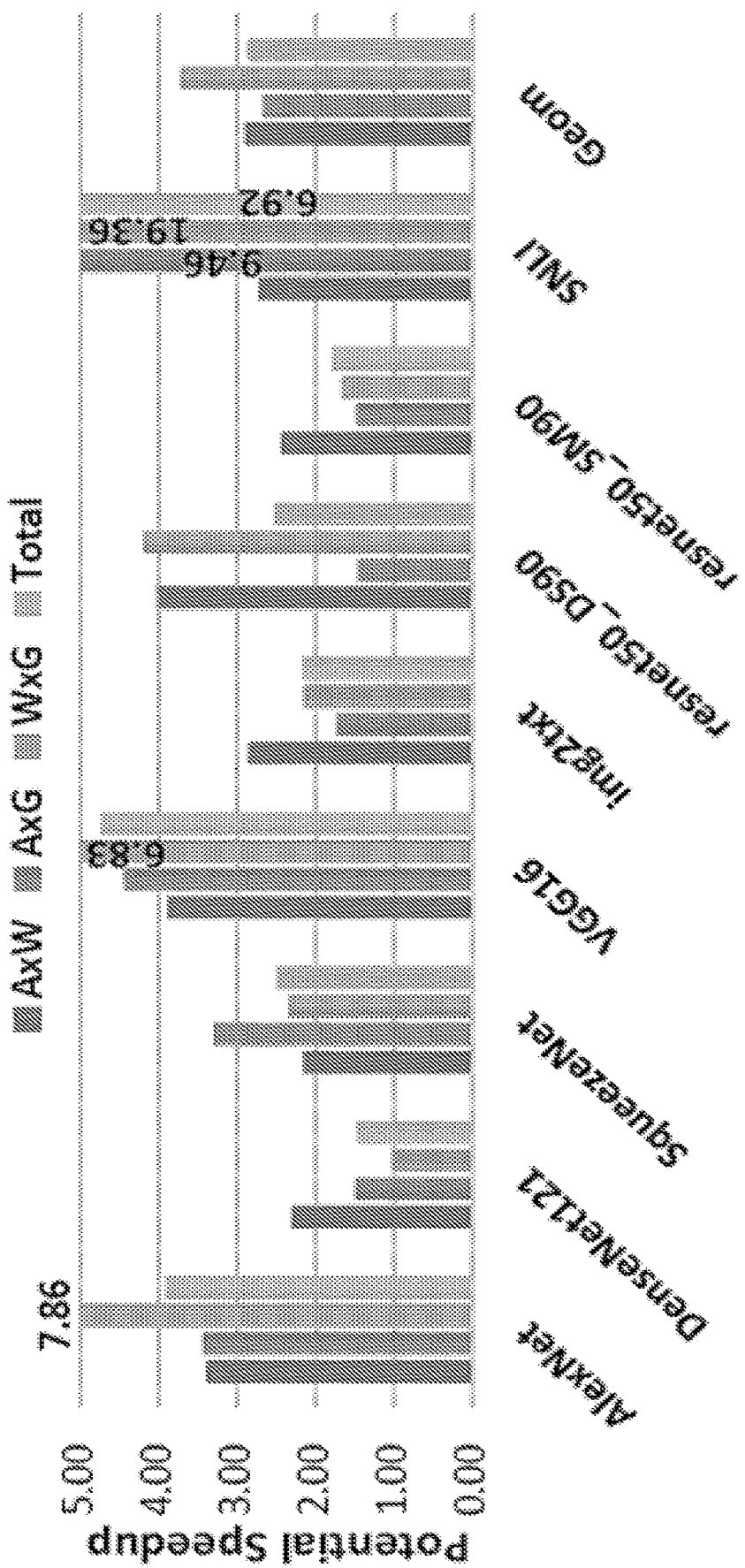
FIG. 4 is a chart showing an example of total potential work reduction for each of three operations per model in accordance with example experiments.

FIG. 4 is a chart showing an example of total potential work reduction for each of the three operations per model. The forward propagation operation (A×W) and the two backward propagation operations (A×G) and (W×G) each perform roughly the same number of MACs. Work reduction is shown as a speedup which is defined as:

$$\frac{\text{remaining } MACs}{\text{all } MACs}$$

where remaining MACs is the number of MAC operations left after eliminating those where the targeted operand is zero. On average across all models, the potential "speedup" for the convolutions is nearly 2.6 times. The least potential is exhibited by the Neural Collaborative Filtering (NCF) recommendation system but even there it is 1.7 times. The potential can go as high as 5.6 times for the natural language inference model SNLI. It is more than 2.4 times for the highly optimized SqueezeNet while being 2.2 times for Facebook's object detection and segmentation model Detectron2. For BERT, the potential is 2 times. While ResNet50 is originally a dense model, pruning techniques induce significant sparsity raising the potential to 1.75 times.

In many cases, deep neural networks can be trained using a variant of the gradient descent algorithm where training samples are run through the network to find the prediction error (gradients) relative to the corresponding labels (forward pass) and then the gradients are backpropagated through the network layers to update the network parameters (backward pass).

During the forward pass, A*W is applied in sequence from the first to the last layer. At every layer, it convolves the weights with the input activations to produce the output activations to be fed to the next layer. The output activations of the very last layer are compared with the ground truth labels to generate the gradients that can then be back-propagated to update the weights throughout. During back-propagation the layers are invoked in reverse order from the last to the first. Each layer convolves its output gradients with the weights to produce the input gradients to be fed to the preceding layer. The layer also convolves its output gradients with its input activations to calculate the weight gradients. The per layer weight gradients are accumulated across the training samples within a mini-batch and used to update the weights once per mini-batch, or iteration, as described by:

$$W_i^{t+1} = W_i^t - \alpha * \sum_{s=0}^{S-1} Gw_i^S / S$$

where i is the layer number, t is the iteration number, $\alpha$ is the learning rate, and S is the mini-batch size.

Figure 5:
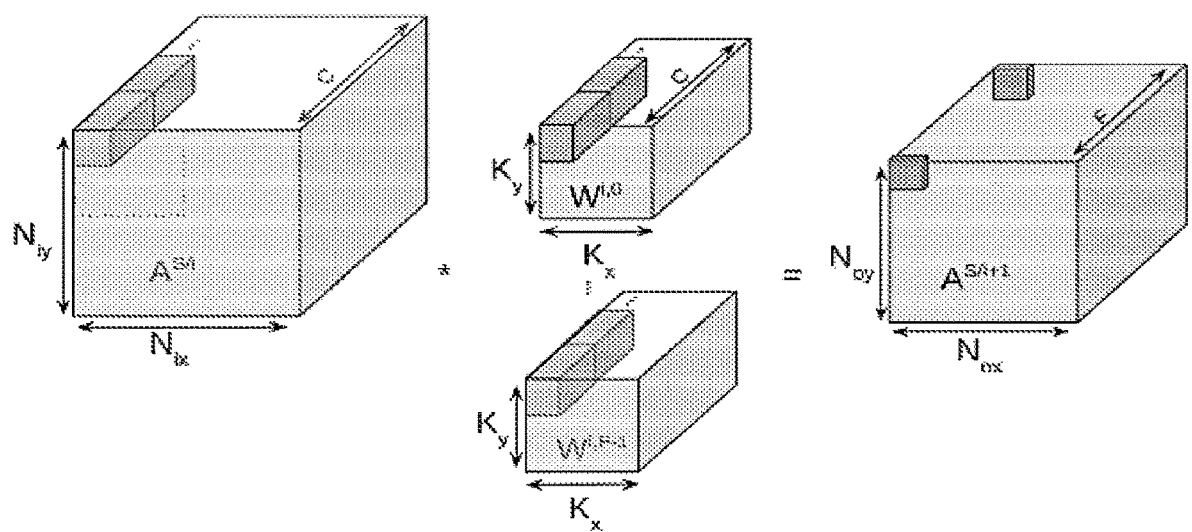
FIG. 5 illustrates an example of a forward pass for a deep learning network (DNN)
Figure 6:
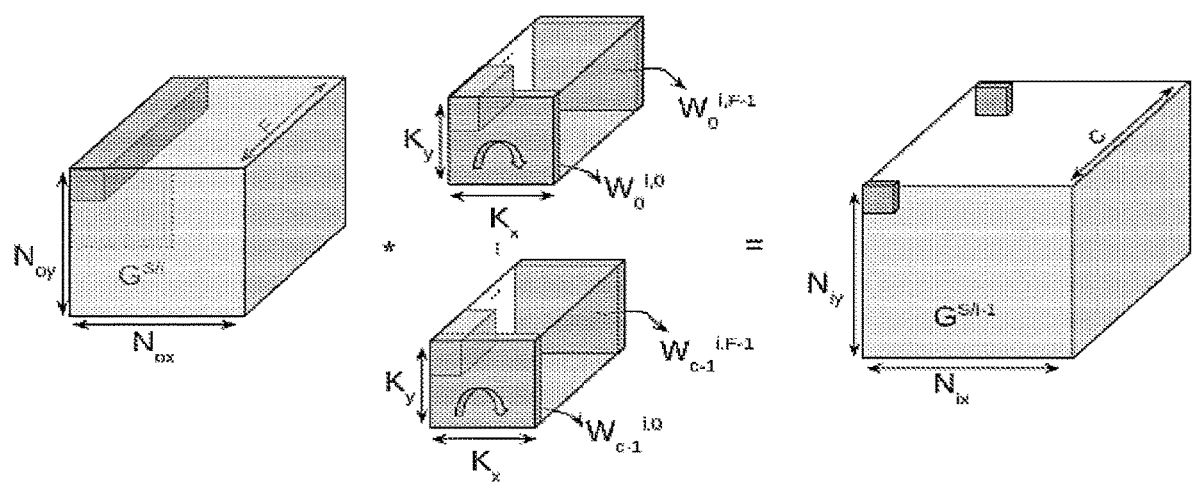
FIG. 6 illustrates an example of determination of input gradients for a backward pass for the DNN.
Figure 7:
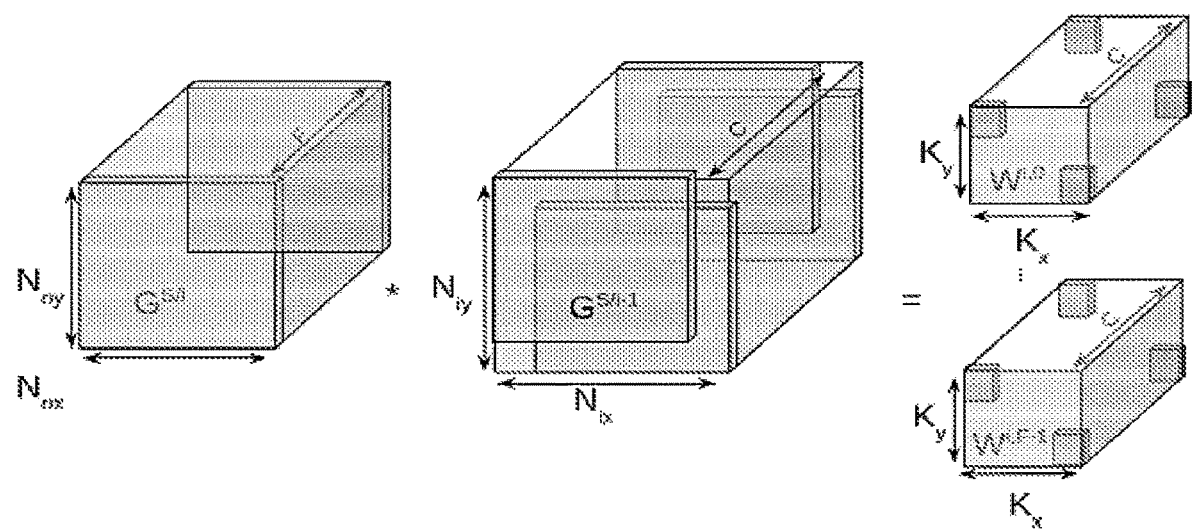
FIG. 7 shows an example of determination of weight gradients for the backward pass for the DNN.

FIGS. 5 to 7 illustrate an example of training of a CNN, exemplifying processing of one training sample. FIGS. 5 to 7 show the operations only for the convolutional layers. A fully-connected layer can be treated as a special-case convolutional layer where all input tensors are of equal size. In this example, weights are updated per batch. The notation used for activations, weights, activation gradients, weight gradients is respectively $A_{c,x,y}^{S/L}$, $W_{c,x,y}^{L,F}$, $G_{c,x,y}^{S/L}$, $Gw_{c,x,y}^{S/L,F}$ where S refers to the training sample, L refers to the network layer, F is the weight filter, c is the channel number, and x,y are the 2D spatial coordinates. The stride is denoted as st.

FIG. 5 illustrates an example of a forward pass. For the convolutional layer, a sliding-window three-dimensional (3D) convolution is performed between the input activations and each of the weight filers to produce one channel in the output activations:

$$A_{oc,ox,oy}^{S/i+1} = \sum_{ci=0}^{C-1} \sum_{xi=0}^{Kx-1} \sum_{yi=0}^{Ky-1} A_{ci,ox*st+xi,oy*st+yi}^{S/i} * W_{ci,xi,yi}^{i,oc}$$

For the fully-connected layer, each filter produces one output activation:

$$A_{oc}^{S/i+1} = \sum_{ci=0}^{C-1} A_{ci}^{S/i} * W_{ci}^{i,oc}$$

FIGS. 6 and 7 illustrate an example of the backward pass. FIG. 6 illustrates an example of determination of input gradients. For the convolutional layer, a sliding-window 3D convolution is performed between a reshaped version of the filters with the activation gradients from the subsequent layer. The filters are reconstructed channel-wise and rotated by 180 degrees and the activation gradients are dilated by the stride st:

$$G_{oc,ox,oy}^{S/i-1} = \sum_{ci=0}^{F-1} \sum_{xi=0}^{Kx-1} \sum_{yi=0}^{Ky-1} G_{ci,ox+xi,oy+yi}^{S/i} * Wrot_{oc,xi,yi}^{i,ci}$$

For the fully-connected layer, each filter produces one output activation:

$$G_{oc}^{S/i-1} = \sum_{ci=0}^{F-1} G_{ci}^{S/i} * W_{oc}^{i,ci}$$

FIG. 7 illustrates an example of determination of weight gradients. For the convolutional layer, the weight gradients are accumulated across batch samples. Per sample, it is determined as a 2D convolution between the 2D channels of the input activations and the channels of the output gradients which are dilated according to the stride:

$$Gw_{oc,ox,oy}^{total/i,f} = \sum_{si=0}^{S-1} \sum_{xi=0}^{Nox-1} \sum_{yi=0}^{Noy-1} G_{f,xi,yi}^{si/i} * A_{oc,ox+xi,oy+yi}^{si/i}$$

For the fully-connected layer, each weight gradient is a scalar product of the input activation and the gradient of the output activation it affects. The gradient of a weight is accumulated over the samples of a mini-batch before applying the update to the weight:

$$Gw_{oc}^{total/i,f} = \sum_{si=0}^{S-1} G_{f}^{si/i} * A_{oc}^{si/i}$$

Figure 8:
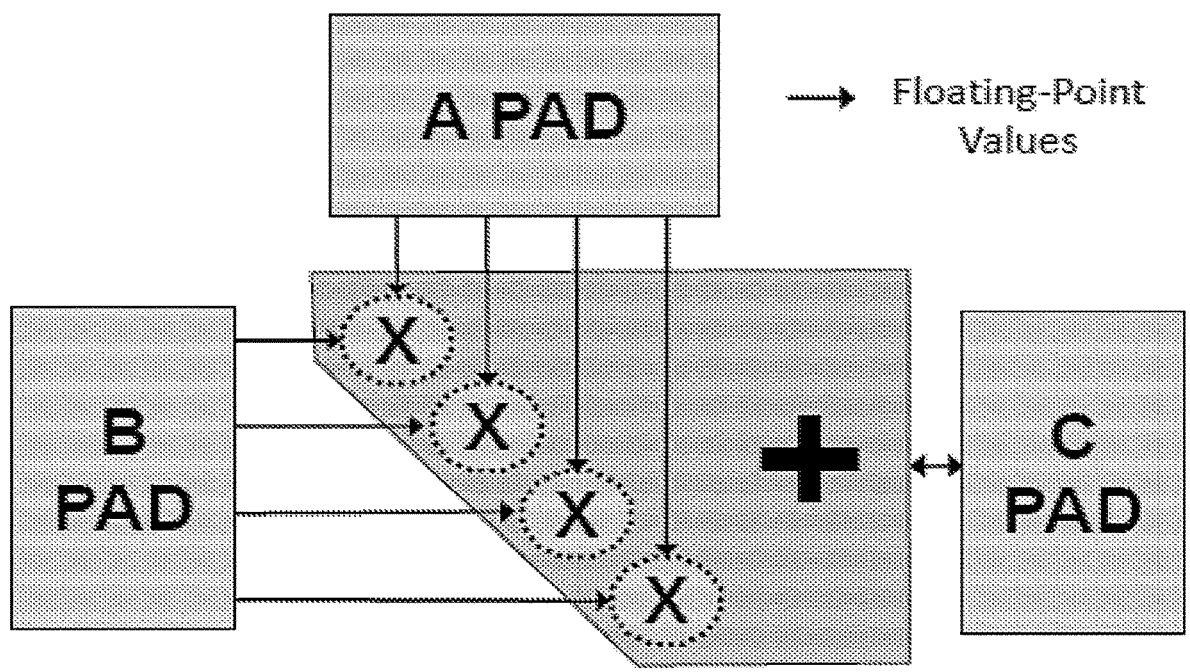
FIG. 8 illustrates an example baseline processing element.

An example architecture for training artificial neural networks are NVIDIA™ graphics processing units (GPUs) with the Tensorcore extension (TCs). In an example, a building block of a baseline accelerator, in accordance with the present embodiments, can include Tensorcore-like units. The TC is designed to maximize computation throughput under the data supply constraints of the existing memory datapath and, as a result, the internal organization may vary per GPU generation. In a particular case, a TC can perform a 4×4 floating-point matrix multiplication per cycle, i.e., 64 MACs per cycle. It can be implemented as a tile of 4×4 processing elements (PEs) where each PE, as shown in FIG. 8, can perform 4 MACs/cycle all contributing to the same output. For example, these could be four pairs of (activation, weight) all contributing to the same output activation, or they could be four pairs of (output gradient, weight) all contributing to the same input gradient.

Such PEs are generally more energy efficient in comparison with a single MAC unit because they amortize the energy cost of updating the accumulator over several operations, and the cost of the summation stage by fusing the MACs. Similar to TCs, the PEs implement mixed-precision MAC arithmetic where multiplication is done in floating-point-16 (FP16) while accumulation is performed in floating-point-32 (FP32). The processing element can have three local scratchpads, two for inputs and one for outputs. An accelerator may use a grid of these PEs each with separate scratchpads or it may organize several of them in a tiled grid sharing the buffers to exploit temporal and spatial reuse. While the above case assumes mixed-precision floating point values (as in TCs), the present embodiments are datatype-agnostic and can work with any datatype, e.g., bfloat16, fixed-point, or specialized narrow floating-point.

Figure 9:
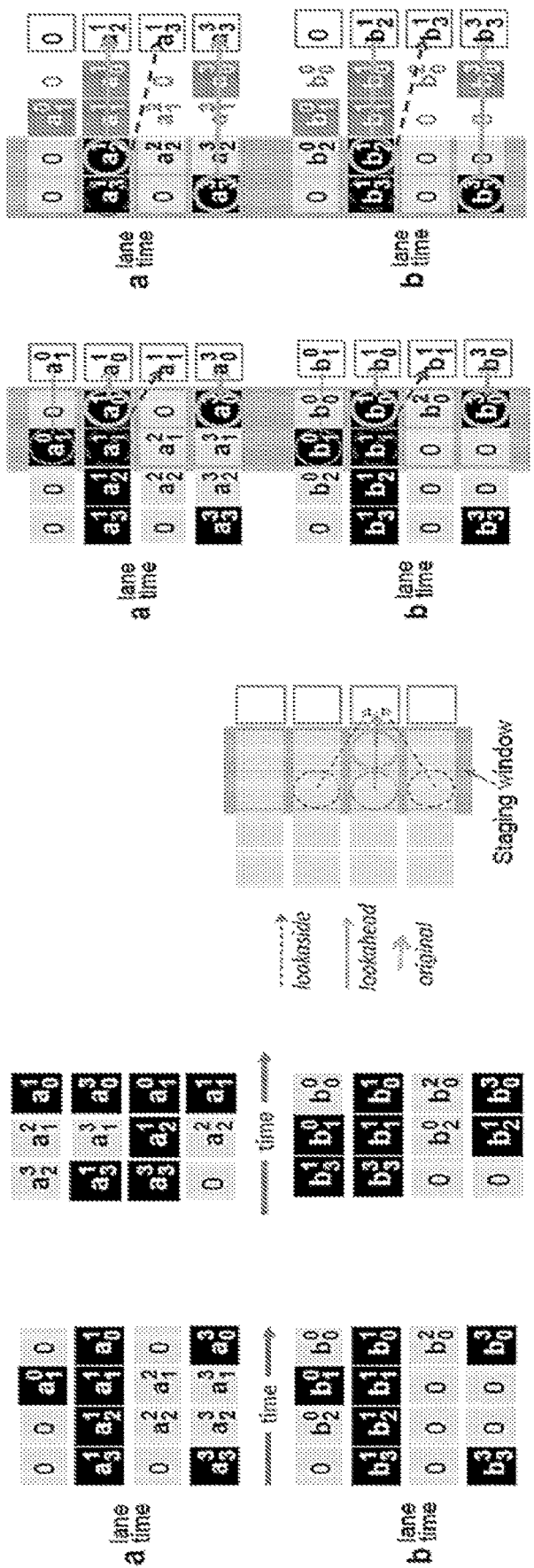
FIG. 9A shows an example of processing of 16 value-pairs without elimination of those that are ineffectual.
FIG. 9B shows an example of an approach where the non-zero values are allowed to independently move with no restriction both in time and spacetime.
FIG. 9C illustrates a diagram of an example of the system of FIG. 1 exploiting sparsity with a limited set of value movements per lane.
FIGS. 9D and 9E are diagrams showing cycles 1 and 2, respectively, for an example approach of the system of FIG. 1.

In an example, consider two input streams as A and B while using C to refer to the outputs. FIG. 9A shows an example of how 16 value-pairs can be processed when the system does not attempt to eliminate those that are ineffectual (at least one of the two input values is zero). The input values are denoted as $a_{time}^{lane}$ and $b_{time}^{lane}$, where lane designates the multiplier they appear at, and time is the processing order. FIG. 9A shows that with a dense schedule, when the system 100 processes all pairs regardless of their value, it is straightforward to arrange them in memory so that the PE can read them as groups of four pairs from the input buffers performing four MACs per cycle. The PE needs four cycles to process them all. In this example, however, there are only seven pairs, highlighted in black, where both operands are non-zeros. As long as the PE processes these value pairs, the output will be correct. To improve performance and to reduce energy consumption, the system 100 eliminates the ineffectual pairs by filling their positions with effectual pairs. In this way, a PE that performs four MACs per cycle should be able to process all effectual pairs in two cycles. However, such approach may require moving pairs in tandem within both buffers in time (earlier yet to the same lane) and in space-time (earlier and to a different lane).

Some approaches attempt to exploit sparsity during inference. Inference executes only the A*W convolution where the weights are known a priori and so this represents their sparsity pattern. Since there is only one convolution and one pass, a single dataflow is sufficient so that the system can arrange values in memory in the order it wishes to process them. The most challenging layers are generally the convolutional layers because they use sliding windows in their activations. This means that weights will have to be matched with different activations per window. FIG. 9B shows an approach where the non-zero values from both sides are allowed to independently move with no restriction both in time and spacetime. The non-zero values in A are now tightly packed one after the other in memory space and so are the values in B. The values belonging to the same pair are no longer aligned in time nor in space. To avoid processing all ineffectual pairs, the system needs to identify those pairs where both values are non-zero and make them meet at some multiplier. Generally, it is preferable to keep as many multipliers busy as possible. This is a challenging task for two reasons: 1) performing arbitrary movement of values in time and space is expensive in hardware; and 2) to keep the four multiplier lanes busy, it will often be necessary to take values from multiple rows from each buffer.

Some approaches exploit sparsity only on the weight side; for example, by tightly packing the non-zero weights in memory space, so that at runtime the PE can access them one row at a time. Each weight is annotated with metadata so that the system can determine its dense (lane,time) position. A unit maintaining a pool of activation candidates locates and pairs each non-zero weight with its activation. This unit is generally computationally expensive as it performs the function of a crossbar, so that activations can mirror the arbitrary movement of weights in memory space. Other approaches exploit sparsity on both sides allowing weights and activations to freely move both in time and space-time. In an example, an indexing module is tasked with matching non-zero weights and activations. Other approaches improve efficiency by imposing structural constraints on how the model is pruned. Effectively, such approaches can eliminate ineffectual pairs only if n of them appear together in a single n-wide row. These structural constraints must be imposed during pruning. Other approaches exploit sparsity on both sides, albeit by paying the deployment cost for independent buffer banks per multiplier input (both A and B). They support movement of values only in time and hence cannot effectively handle work imbalance across lanes where "Struggler" lanes become a bottleneck. In an example, non-zero weights and activations can be tightly packed in memory and process only effectual pairs where both operands are not zero at runtime. To do so, values are processed one channel at a time so that the product of any weight with any activation is guaranteed to contribute to an output activation assuming a stride of 1. In this way, all data movement is avoided at the input. However, it does require a crossbar to route products to the target accumulator banks. The crossbar and number of banks are over-provisioned to avoid stalls due to bank conflicts which would otherwise be significant. Other approaches use a low-cost sparse interconnect at the front-end and a software scheduler to extract sparsity in the weights of pruned models without imposing restrictions on how sparsity is structured. On the activation side, such approaches target sparsity within values (bit-level sparsity) and for that they use shift-and-add multiplier-based MAC units. Other approaches extract sparsity from both weights and activations using an efficient vector-based encoding in memory; targeting recurrent neural networks and operating on fixed-point values.

None of the above approaches are applied in training. The present embodiments advantageously address, at least, the following substantial challenges in the art:

The sparsity pattern during training is always dynamic. In contrast, during inference, the weights are statically known and, as a result, they can be pre-packed in memory after eliminating zero weights.

During training, each tensor participates in two convolutions or operations. The group of values that contribute to an output in each convolution is different, and so must be the order in which they are arranged. For example, the filter channels during the forward pass are different from those of the "reconstructed" filters during the backward pass. The "reconstructed" filters during the backward pass are formed by taking the weights from the same channel across all filters, stacking those along the channel dimension and then spatially rotating the filter by 180 degrees. Similarly, the gradients need to be bundled together differently for the second convolution than the third. These two convolutions are calculated per layer during the backward pass where we would like to avoid having to spill the gradients off-chip. Thus, there is no single way to pack them in memory (effectively pre-scheduling them) that would work for all cases where they are used.

Activations can be discarded after each layer during inference, which is not the case during training where they are saved to be used by the backward pass.

Inference accelerators use narrow fixed-point arithmetic (e.g., 8b), whereas modern training is predominantly accomplished using floating-point, e.g., FP32, FP16, or Bfloat16. Floating-point values are typically wider making crossbars more expensive, and performing shift-and-add operations to extract bit-level sparsity is nontrivial for floating point.

Training starts with randomly initialized values that keep evolving throughout the training process.

In some cases, to take advantage of a dynamic sparsity pattern that may appear in any or all the three tensors, the present embodiments provide an approach that can dynamically eliminate ineffectual value pairs at runtime from all the three convolutions, or operations, involved in DNN training. For this approach to be energy efficient, avoided are the high hardware cost of an exhaustive interconnect that enables arbitrary moves of the operands as well as the energy and the latency cost of rearranging tensors in different ways to suite the different operations.

The system 100 advantageously removes ineffectual value pairs when processing input tensors; for example, the example input tensors of FIG. 9A. In some cases, the system 100 can be used as an extension of Tensorcore-like processing units that perform 4 MACs per cycle; however, it is understood that the system 100 can be used to extend any data-parallel unit. For example, the present inventors have performed example experiments using the system 100 for units of width up to 16 MACs. In an example of the present disclosure, the system 100 can be understood to be processing a 3D convolution of two input tensors A and B and that the processing elements perform 4 MAC operations concurrently.

Figure 10:
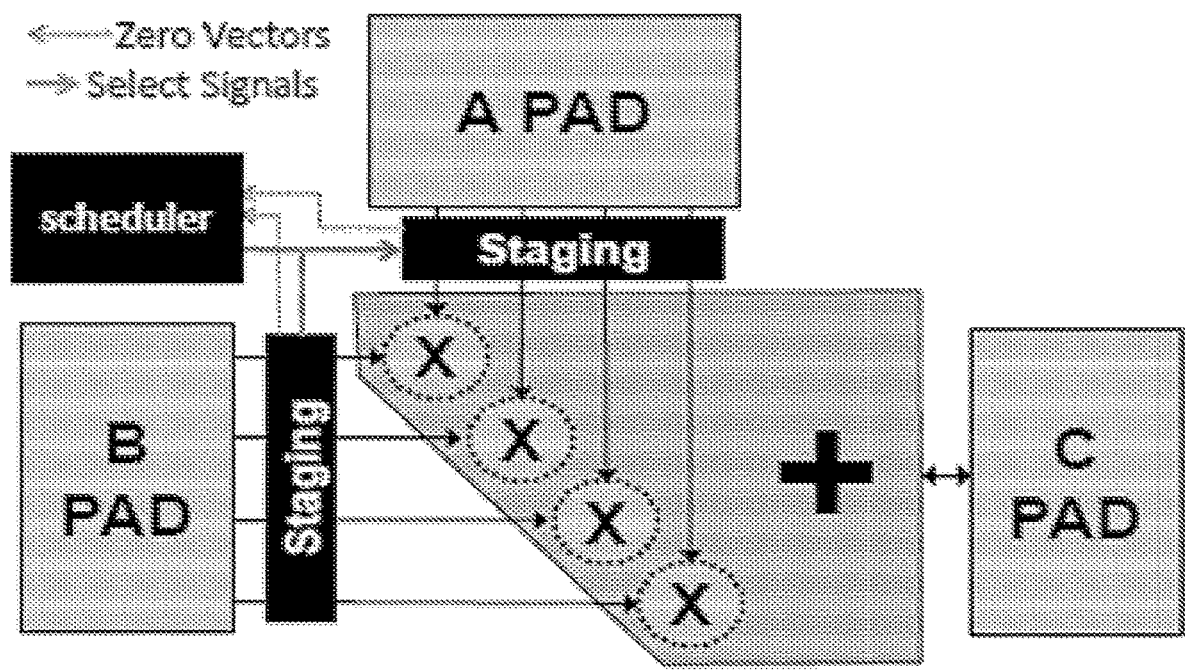
FIG. 10 illustrates an example diagram of a processing element of the system of FIG. 1.

FIG. 10 illustrates an example diagram of processing element 122; in this example, a sparse interconnect extending a processing element of Tensorcore. The sparse interconnect including staging buffers and a scheduler. In an example, there are staging buffers for A and B, where the depth of each staging buffer is a predetermined parameter. In an example, assume that this depth is 2, such that each staging buffer can hold up to two rows of values. Writes to these staging buffers are row-wide. There are four single-value-wide read ports each feeding directly to a multiplier input. As FIG. 9C illustrates, the connectivity per read port is sparse: each port can read one out of a limited set of values, four in this example, within the staging buffer. In some cases, the set of values that each port can read out is different, but can overlap.

In an example, the scheduler can be a hardware scheduler that accepts a bit vector from each staging buffer identifying which values are non-zero. For 2-deep staging buffers, the bit vectors would be 8b wide for this example. Each cycle the scheduler selects up to 4 effectual pairs from the staging buffers. It generates the control signals for the read ports, 2b per port for this example, where each port has a set of four candidate values, so that the corresponding values are read out. The same control signal is shared among the corresponding ports in the two staging buffers, i.e., the same control signal goes to port p in the horizontal and vertical staging buffers so that both operands move in tandem (4×2b control signals in total).

FIG. 9C illustrates how the system 100 can effectively exploit sparsity even though it allows only a limited set of value movements per lane. There are two types of movement: in time only or lookahead, and in space-time or lookaside. FIG. 9C shows the set of possible movements for the third multiplier lane: it can either process the original dense value $a^2_0$, the next value in the same lane $a^2_1$ (lookahead), or it can steal a value from a step ahead in time from one of its two neighboring lanes $a^1_1$ or $a^3_1$ (lookaside). The movements possible by the other read ports are structurally identical relatively to their lanes and the ports are treated as if they are arranged into a ring with port 0 being adjacent to port 3. Each port can access a different set of values; however, these sets may overlap. FIGS. 9D and 9E illustrate how the system 100 reduces processing time to the minimum two cycles using just a four-input multiplexer per multiplier input.

For increased performance, the staging buffers generally need to be kept full as much as possible. Thus, the A and B buffers will have to be banked accordingly to sustain a higher read throughput. For the present example, two banks would be sufficient. In general, having as many banks as lookahead is more than enough and the present inventors empirically determined that a lookahead of three is more than sufficient for Tensorcore-like units. For wider units with more MACs, even two banks lookahead may be enough.

Figure 11:
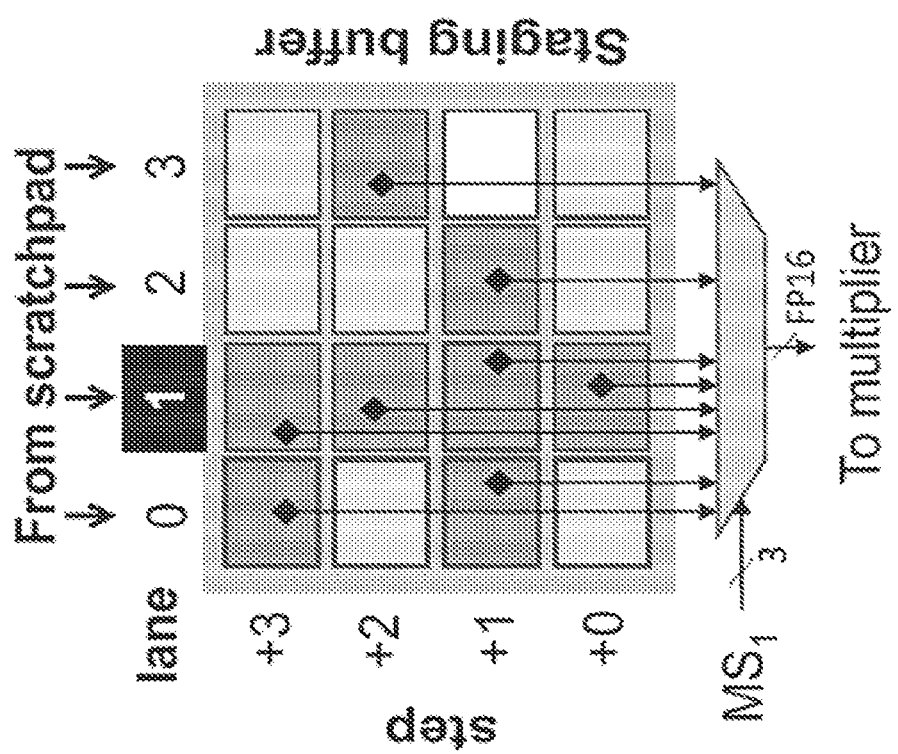
FIG. 11 is a diagram showing an example of connections for lane 1.

For the hardware scheduler of the present example, each PE accepts four pairs (A,B) of FP16 values and performs four MACs per cycle. In some cases, a 4-deep staging buffer is added on each input side. As the example of FIG. 11 shows, the staging buffer can hold four rows, each is 4-value wide, corresponding to the dense schedule for the current step (step +0) and the next three in time (+1, +2 and +3). For every lane there is a multiplexer which implements a sparse connectivity pattern. FIG. 11 shows the connections for lane 1. Besides the original "dense" schedule value, there are three lookahead and four lookaside options per input. For example, the multiplier for lane 1 can be given the value at lane 1 from the current time slot or up to 3 ahead. Alternatively, it can "steal" the values from neighboring lanes. For example, it can get the value from lane 2 that is one time step ahead or the value from lane 3 that is two steps ahead. Each lane has the same connectivity pattern which is shifted relative to its position (wrapping around the side edges). The staging buffer also generates a 4×4b bit vector, denoted as $Z_A$ and $Z_B$ for A and B staging buffers respectively, indicating which of the values are zero. The staging buffer has four write ports, one per row.

The scheduler accepts two bit vectors $Z_A$ and $Z_B$ from the A and B staging buffers and generates two sets of signals. The first set is four $MS_i$,i=0 . . . 3 3-bit signals, one per input lane. These are used as the select signals for the per lane multiplexers. There is one $MS_i$ signal per multiplier, and it is used by the multiplexers on both the A and B sides of that lane. The scheduler also produces a 2-bit AS signal that indicates how many rows of the staging buffer it has been able to drain, so that they can be replenished from the scratchpads which are banked to keep the buffers full.

The $Z_A$ and $Z_B$ 4×4b bit vectors are first bit-wise OR-ed to produce a 4×4b bit vector Z. It indicates which pairs of (A,B) values have at least one zero. These pairs are ineffectual and can be skipped. The scheduler selects a movement per lane, for a total of 4 movements ($MS_i$ signals) so that as many of the remaining effectual (A,B) pairs as possible are processed in one step. The selection of movements that the scheduler makes for one time step can be referred to as a schedule.

For each lane i, the scheduler can use a static priority scheme. In the present example, among the eight options, selecting the first available in the following order (notation is (step,lane) referred to in FIG. 11): (+0,i) (dense schedule), (+1,i) lookahead 1 step, (+2,i) lookahead 2 steps, (+3,i) lookahead 3 steps, and then the lookaside options: (+1,i+1), (+1,i−1), (+2,i+2) and (+3,i+3). In this example, use of an 8b-to-3b priority encoder suffices. However, having selection for all lanes made independently may yield an invalid schedule; the same pair may be chosen for multiple lanes and end up being multiplied and accumulated more than once.

Figure 12:
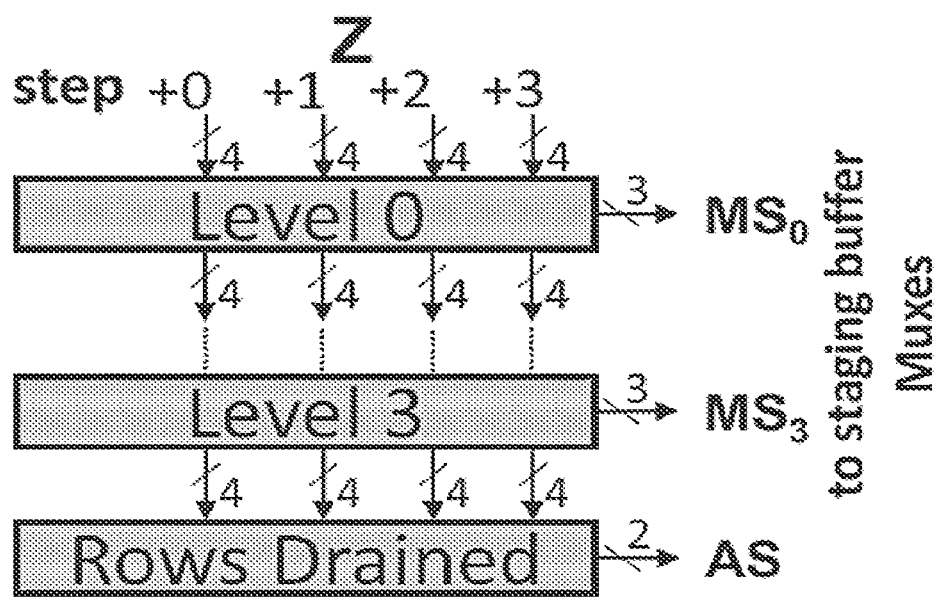
FIG. 12 illustrates a diagram of an example implementation of a scheduler.

To ensure that the scheduler always produces a valid schedule, one where each value pair is selected once, a hierarchical scheme can be used where scheduling is done in four levels; as exemplified in the illustration of FIG. 12. In each level, a subset of the lanes, one lane in the example, make their decisions independently using the current value of the Z vector as input. The lanes assigned at each level are guaranteed by design to not being able to make overlapping choices. After lanes of one level make their selections, they "remove" these options (OR gates) from the Z vector before passing it to the next level. The AS signal can be generated given the bits that are left enabled in Z at the end. While the above is described in steps, it is understood that the scheduler can be combinatorial and operate in a single cycle.

In the above example, a single processing element (PE) is described, which can exploit sparsity on both operands. A Tensorcore can be implemented as a tile (e.g., 4×4) of such PEs. While a PE can exploit reuse only temporally, spatial data reuse is also possible by having the PEs along the same row share the same B input and PEs along the same column share the same A input. For example, during the forward pass and for a convolutional layer, each row can be processing a different filter, whereas columns can be processing different windows. In this arrangement, each PE would be processing a unique combination of B and A inputs. Skipping zeros on both A and B sides remains possible if per PE schedulers and staging buffers are used.

Figure 13:
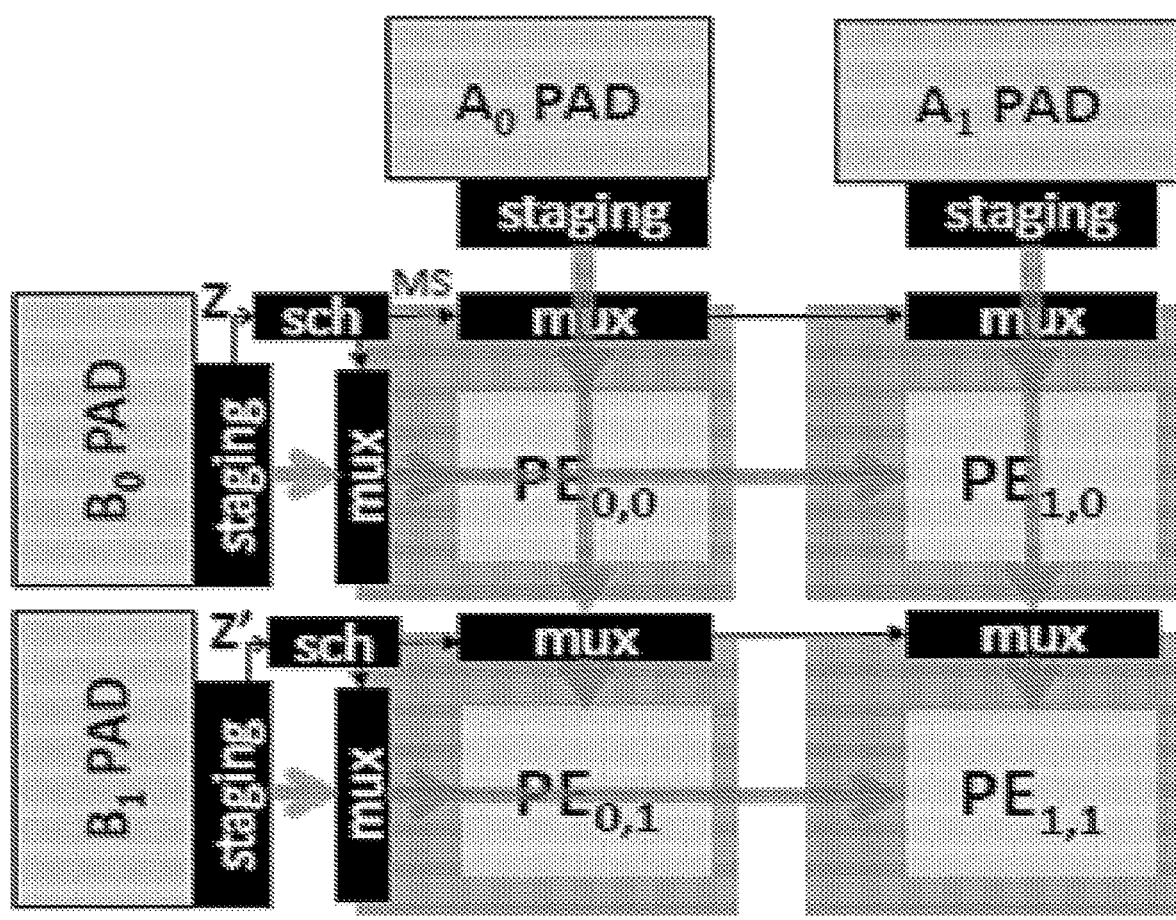
FIG. 13 shows a simplified core with 2×2 tile configuration for the system of FIG. 1.

In the present example, sparsity is extracted from only the B side since there is sufficient sparsity in one of the operands in each of the three major operations to extract significant benefits. FIG. 13 shows a simplified core with 2×2 tile configuration. Each row of PEs uses a common scheduler and shares the same staging buffer and multiplexer block on the B side. For the A side, there is a single staging buffer per column and a dedicated multiplexer block per PE. The A-side multiplexer blocks per row share the same $MS_i$ signal from the row scheduler. Each scheduler now needs to see only the Z vector from the corresponding B-side staging buffer. The present inventors evaluated the configuration for both TensorDash and Tensorcore (4×4 tile of PEs) as the main building block.

During training, each tensor can be used in more than one of the computations. For example, the weights in the forward pass can be convolved with the activations, whereas in the backward pass, they can be convolved with the output gradients. In each operation, the group of weights that contribute to an output value is different. This is true for the weights, activations and gradients. This has implications for the memory hierarchy, which may need to supply the data in an appropriate order to the PEs. When a tensor is used in only one way it is possible to statically layout its values in memory so that they can be easily served using wide accesses off-chip and on-chip. However, during training, the layout that serves well one of the computations may not be able to serve well the other. Fortunately, it is possible to arrange values in memory so that they can be easily fetched for all use cases by having the ability to transpose tensors as needed. In some cases, a tensor layout is used in which values are stored in groups of 4×4 values. The group is formed by taking four blocks of values adjacent along the X dimension. Each of these blocks contains four consecutive values along the channel dimension. The starting coordinates for each 4×4 value group are aligned by four along the X and the channel dimensions. Finally, the groups constituting a tensor are allocated in memory space, for example, in channel, Y, X order.

When fetching values from off-chip, each group can be written directly to the multi-bank on-chip memories so that each 4-value block is copied directly to a bank. As a result, the PE can now directly access any block of 4 values consecutive along the channel dimension in a single step. When transposing is needed, on-chip transposers can be used between the on-chip memory banks and the tile scratchpads. The number of transposers can be chosen so that the memory system can keep the tiles busy. Each transposer reads four 4-value blocks from their banks using 4-value wide accesses and copies those into its internal 4×4 buffer. The transposer then can provide four blocks of four values each composed of a single value from each of the four original blocks read from memory effectively transposing the tensor. For example, it can supply a block comprising all values that appear first within their original block, or all that appeared third. This transposition approach can be applied to all the three computation operations involved during training.

Figure 3:
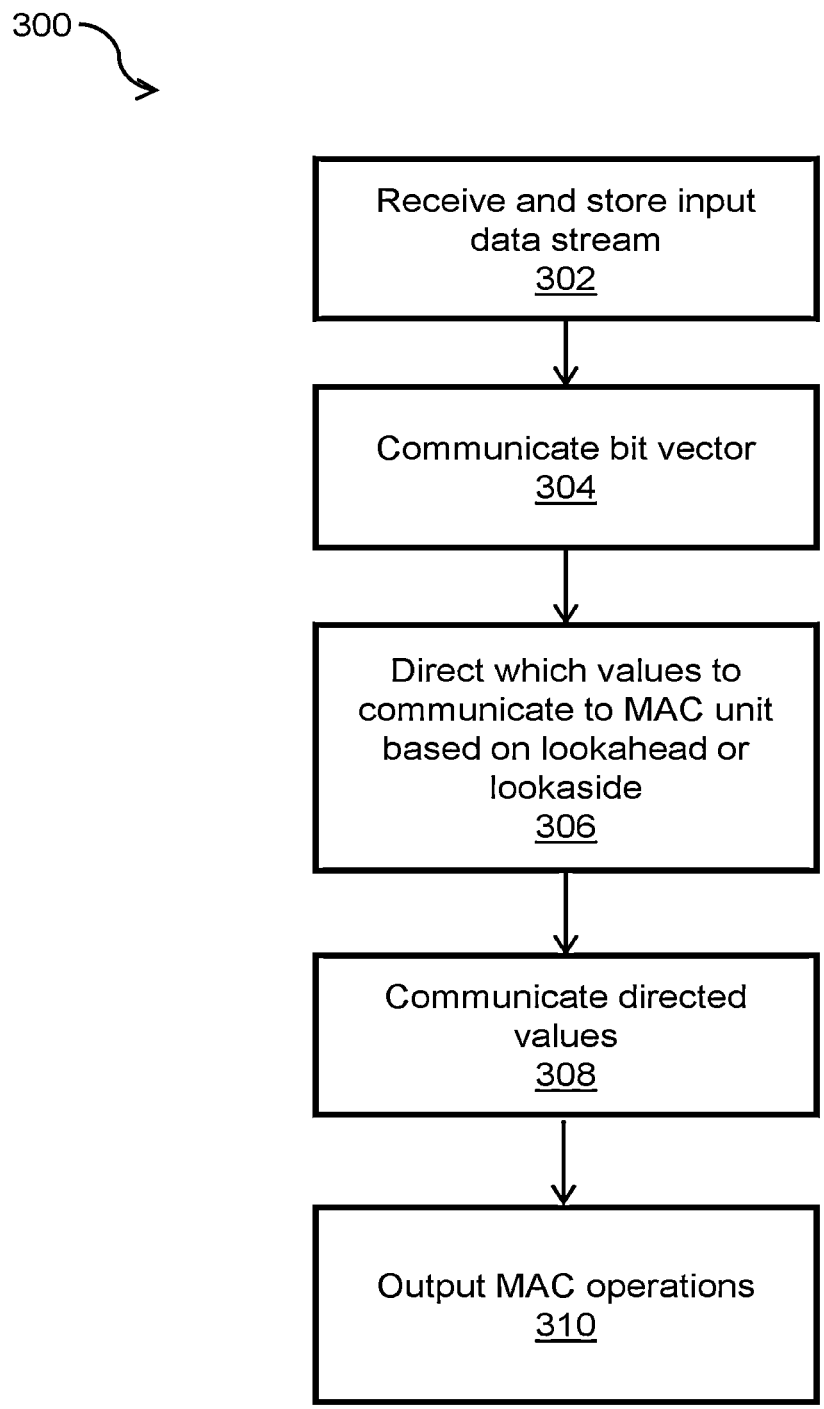
FIG. 3 is a flow chart of a method for using sparsity to accelerate deep learning networks, in accordance with an embodiment.

FIG. 3 illustrates a flowchart for a method 300 for using sparsity to accelerate deep learning networks for a processing element 122, according to an embodiment.

At block 302, each of the staging buffers 126 receive and store an input tensor from a respective one of the plurality of input streams 124.

At block 304, the scheduler 128 receives a bit vector from each staging buffer 126 identifying which values stored in the respective staging buffer 126 are non-zero.

At block 306, the scheduler 128 directs the staging buffer 126, per lane, which values to communicate to the MAC unit 130 in order to arrive at effectual pairs. The direction includes performance of one of: communicating the current value in the lane, communicating the next value in the same lane where such value is non-zero, communicating a value from a step ahead in time where such value is non-zero, and communicating a value from a neighboring lanes where such value is non-zero.

At block 308, each staging buffer 126 communicates the directed values to the MAC unit 130 to perform MAC operations.

At block 310, the MAC unit 130 outputs the values of the MAC operations; for example, to other processing elements 122, to the non-volatile storage 112, to the database 116, to the network interface 110, or to the output interface 108.

The present inventors performed example experiments to evaluate the advantages of the present example, as shown in TABLE 1, on deep neural network (DNN) models covering a wide range of applications:

image classification trained on ImageNet: SqueezeNet, VGG, and ResNet-50.

scene understanding via img2txt trained on Microsoft COCO dataset.

natural language modeling, including BERT, the Transformer-based model from Google trained on the GLUE dataset, and SNLI, which is trained on the Stanford Natural Language Inference corpus.

object detection and segmentation: Facebook's Detectron2 model trained on Microsoft COCO dataset.

recommendation system, including Neural Collaborative Filtering (NCF) trained on the MovieLens 20M movie ratings dataset.

To illustrate the benefits from techniques that incorporate pruning during training of dense models, two variants of ResNet-50 were trained including: a dynamic sparse re-parameterization technique, and a sparse momentum technique. For both techniques, 90% sparsity was targeted.

In example experiments, all models were trained on an RTX 2080 Ti GPU using the PyTorch implementations. Each model was trained for as many epochs as needed for it to converge to its best reported output accuracy. For each epoch, one randomly selected batch was sampled and the operands of the three operations described herein were traced. The batch size was different per model due to their different GPU memory requirements. It ranged from as low as 64 and up to 143 samples per batch.

TABLE 1

| TensorDash and Tensorcore-based Baseline | | | |
|---|---|---|---|
| TC core | 4 × 4 PEs | | |
| # of TCs | 256 | AM SRAM | 128 KB × 64 Banks |
| PE MACs/Cycle | 4 | BM SRAM | 128 KB × 64 Banks |
| | | CM SRAM | 128 KB × 64 Banks |
| Staging Buff. Depth | 4 | Scratchpads | 256 KB total |
| Tech Node | 65 nm | Frequency | 500 MHz |
| Off-Chip Memory | | 16GB 4-channel LPDDR4-3200 | |

A custom cycle-accurate simulator was used to model performance. Extensive microbenchmark stress test were performed to validate the fidelity of the simulator. TABLE 1 lists the default configurations for the Tensorcore-based baseline including the extension of the present embodiments. To model area and power consumption, all designs were implemented in Verilog, synthesized via the Synopsys Design Compiler, and layout was produced via Cadence Innovus. Power was estimated by capturing circuit activity via Mentor Graphics' ModelSim which was then passed on to Innovus. CACTI was used to model the area and energy consumption of the on-chip shared SRAM memories which are divided into three heavily banked chunks: AM, BM, and CM. CACTI was also used to model the area and energy consumption of the SRAM scratchpads (SPs). Finally, energy and latency for off-chip accesses were modelled via Micron's DRAM model. Both the baseline architecture and the architecture of the present embodiment compress zero values off-chip using CompressingDMA.

TABLE 2

|  | Area (mm$^2$) | | Power (mW) | |
| --- | --- | --- | --- | --- |
|  | Present system | Baseline | Present system | Baseline |
| Compute Cores |  | 68.74 |  | 23,748 |
| Transposers | 0.37 | — |  | 44.4 |
| Schedulers + B-Side MUXes | 1.79 | — | 241.0 | — |
| A-Side MUXes | 3.63 | — | 283.8 | — |
| Total | 74.53 | 69.11 | 24,318 | 23,793 |
| Normalized | 1.08× | 1× | 1.02× | 1× |
| Energy Efficiency |  |  | 1.9× | 1× |

Figure 14:
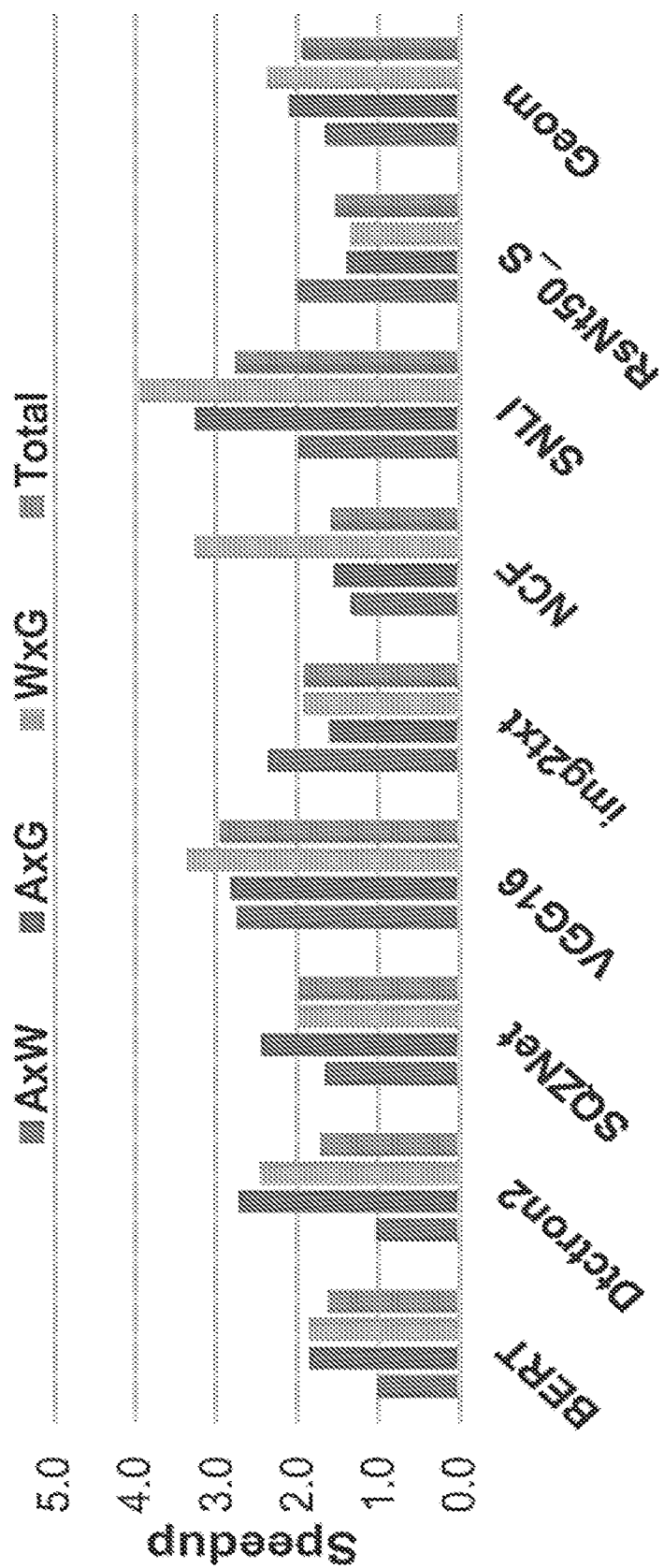
FIG. 14 is a chart showing speedup achieved by incorporating the system of FIG. 1 in a Tensorcore architecture for respective models.

FIG. 14 is a chart showing speedup achieved by incorporating the present system in the Tensorcore architecture for each model and for each of the three operations: (i) A*W, (ii) A*G, and (iii) W*G. Since the amount of sparsity and its pattern in each of the tensors differ across models, layers, and training phase, the speedup varies. On average, the present system accelerates execution by 1.95× and never introduces any slowdown.

It was determined that the present embodiments benefit all models. The benefits for BERT and Dtcron2 come from their backward pass. Dtcron2 consists of: 1) a pretrained ResNet-50 backbone, 2) a feature pyramid network (FPN) that extracts high-level semantic feature maps at different scales, 3) a region proposal network (RPN) that proposes candidate object bounding boxes, 4) a network head performing bounding-box recognition, classification, and regression, and 5) a network head for mask prediction that is applied separately to each region of interest. The two front-end convolution layers of the FPN and RPN, which dominate the execution time, show negligible input activation sparsity. However, the use of ReLU directly after these dominating layers results in significant (73%-94%) sparsity in the gradients for these layers that the system 100 exploits during the backward pass. BERT is dominated by fully-connected-like layers which exhibit little sparsity in their weights and activations. But, despite not using ReLU, sparsity is evidenced in its gradients during the backward pass where the attention mechanism of its encoder and decoder layers results in roughly 60% sparsity in the gradients for most of the layers.

ResNet-50, VGG16, and SQZNet are among the models that use ReLU and thus benefit from the sparsity it generates. In ResNet-50, the benefits are lower during the backward pass. This is predominantly caused by the use of batch normalization (BatchNorm) layers between each convolutional layer and the subsequent ReLU layer. A BatchNorm layer absorbs almost all the sparsity in the gradients. Fortunately, however, there is still sparsity in either the activations or the weights which is exploited. The use of in-training pruning creates considerable sparsity in the weights, especially for the smaller back-end layers, which the system 100 exploits during the W*G operation.

SNLI performs natural language inference task through recognizing textual entailment between pairs of human-written English sentences. It includes two fully connected (FC) projections layers, two LSTM encoders, and four fully connected classifier layers. Significant sparsity was observed in the gradients and activations, which explains the observed benefits with the present embodiments. The gradients exhibit more than 95% sparsity due to the nature of the task and the use of ReLU activations. Input activation sparsity is 63% and 60% for the two front-end projection layers, 0% for the first classification layer, and over 94% for other layers.

The NCF recommendation system consists of four FC layers with the first layer being the largest. The gradients are 83% sparse, which benefits the W*G operation. In some cases, the first layer is not acted upon because it is the most expensive and also exhibits no activations sparsity.

Figure 15:
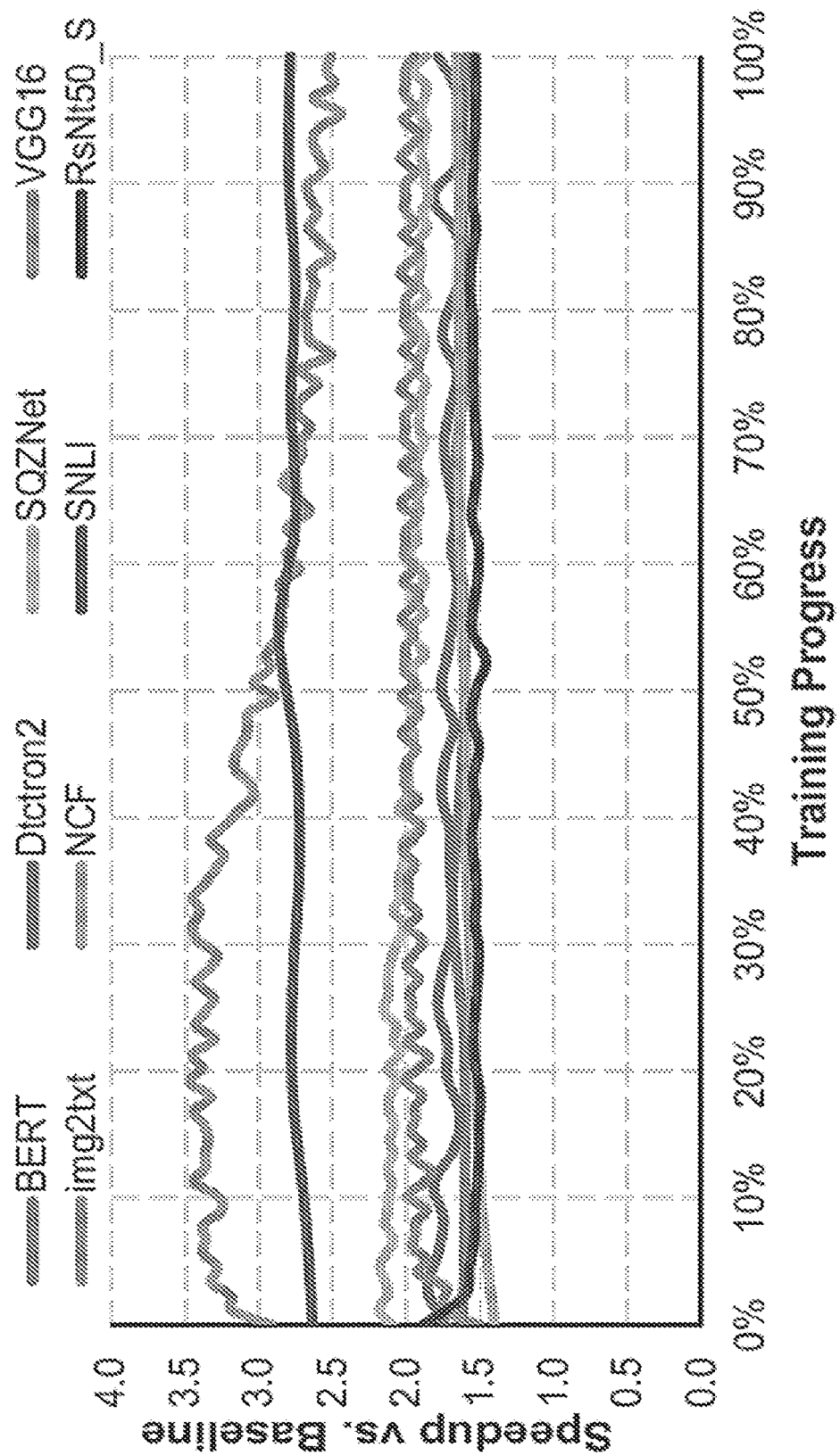
FIG. 15 illustrates execution time speedup with the system of FIG. 1 during training from the first epoch up until convergence.

FIG. 15 illustrates execution time speedup with the system 100 during training from the first epoch up until convergence. Generally, improvements with the system 100 are fairly stable throughout the entire training process, which suggests that the underlying phenomena that the system 100 exploits are neither transient nor caused by initialization.

The measurements reveal two trends. For ResNet50, which uses a in-training pruning approach, speedups are slightly higher during the first few epochs, and then reduce and stabilize at around 1.5×. Similar, albeit slightly more subdued behavior is seen for the other dynamic sparse re-parameterization technique. This behavior is due to the pruning algorithm which starts by aggressively pruning many weights at the beginning, which the training process then "reclaims" to recover the accuracy of the model.

For the dense image classification models, where most of the sparsity the system 100 exploits originated from the activations and the gradients, the speedup tended to follow an overturned U-shape curve. This behavior was more pronounced for VGG16 model, where the benefits are initially lower due to the random initialization of the model. Then benefits rapidly increased during the first few epochs as the model was quickly improving by learning what features of the input data were irrelevant for the task. This translated to rapid increases in sparsity in both the activations and the gradients. The speedup then stabilized until 40%-50% of the training process was reached. It then gradually decreased as it entered the second half of the training process where the model started to extract some of the less-important previously discarded features to improve accuracy. During the final quarter of the training process, the speedup stabilized as the model parameters were very close to their final values and thus the sparsity of the activations and gradients stabilized.

Figure 16:
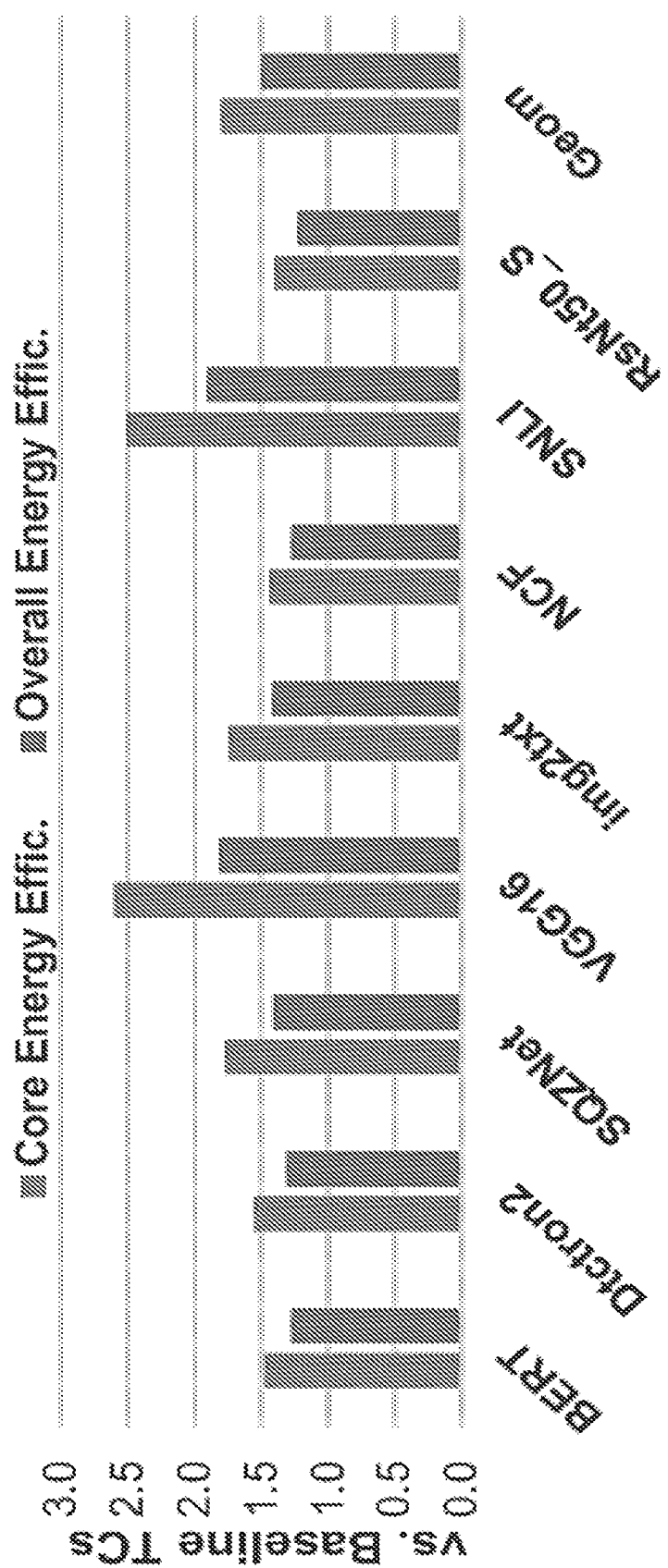
FIG. 16 illustrates per model energy efficiency for \compute core logic and a whole chip.

TABLE 2 shows a breakdown of the area and the power consumption. Even without taking the on-chip and off-chip memories into account, the area and power overhead of the system 100 is small; only 14% extra silicon area and 9% power are needed for the schedulers and the back-end shufflers. Given the speedup, the compute logic alone becomes on average 1.8× more energy efficient compared to the plain Tensorcore. FIG. 16 illustrates per model energy efficiency for the compute core logic and the whole chip.

Each of the on-chip AM, BM and CM memory chunks required 58.6 mm$^2$ of area, whereas the scratchpads required a total of 3.95 mm$^2$ for the baseline and 5.9 mm$^2$ for the system 100 due to more banking. In total, when considering both the compute and memory area of the whole chip, the area overhead of the system 100 stood at only 4.8%. As FIG. 16 shows, when the accesses to the on-chip memories, the scratchpads, and the off-chip DRAM are taken into account, the system 100 improved overall energy efficiency of the Tensorcore architecture by 1.5×.

Figure 17:
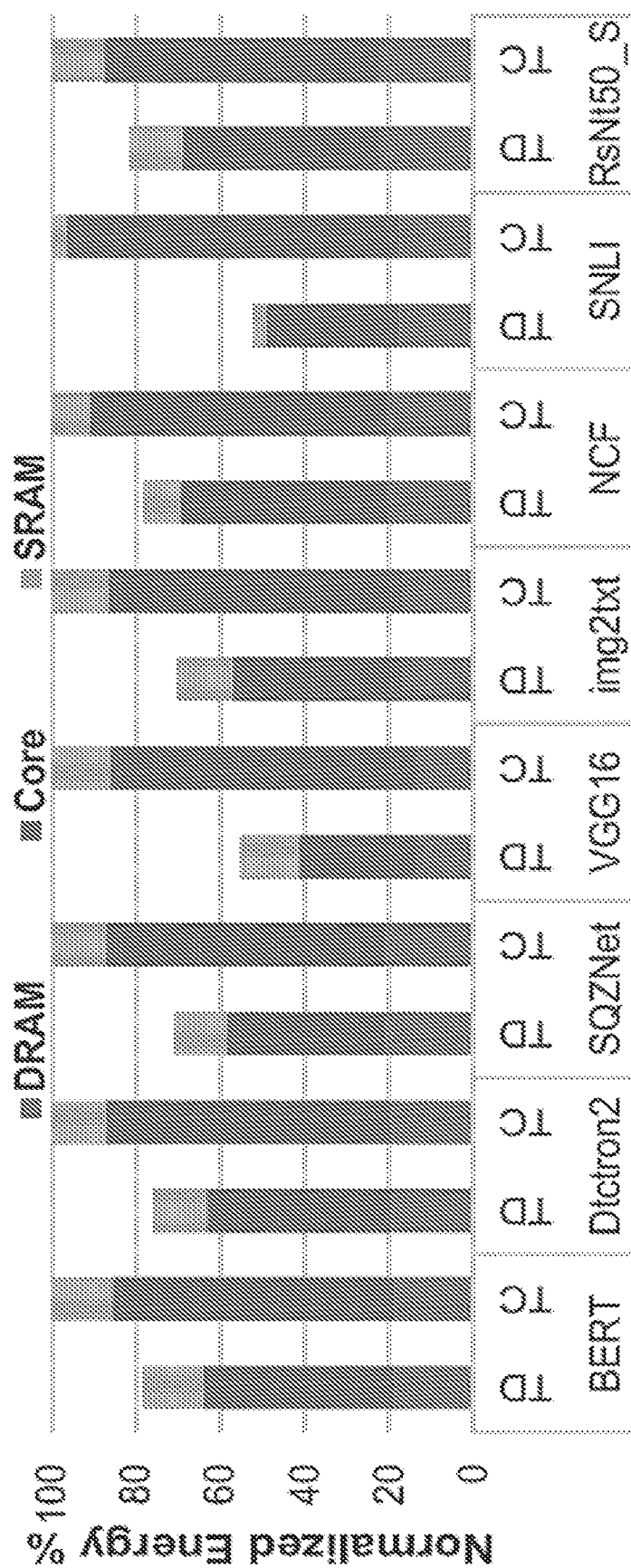
FIG. 17 illustrates energy consumed with the system of FIG. 1 relative to baseline.

FIG. 17 reports the energy consumed with the system 100 relative to the baseline. The measurements also show a breakdown of the energy consumed across the three main components: the off-chip data transfers, core logic, and the on-chip memory modules. The system 100 significantly reduced the energy consumption of the compute cores, which dominate the overall energy consumption.

Figure 18:
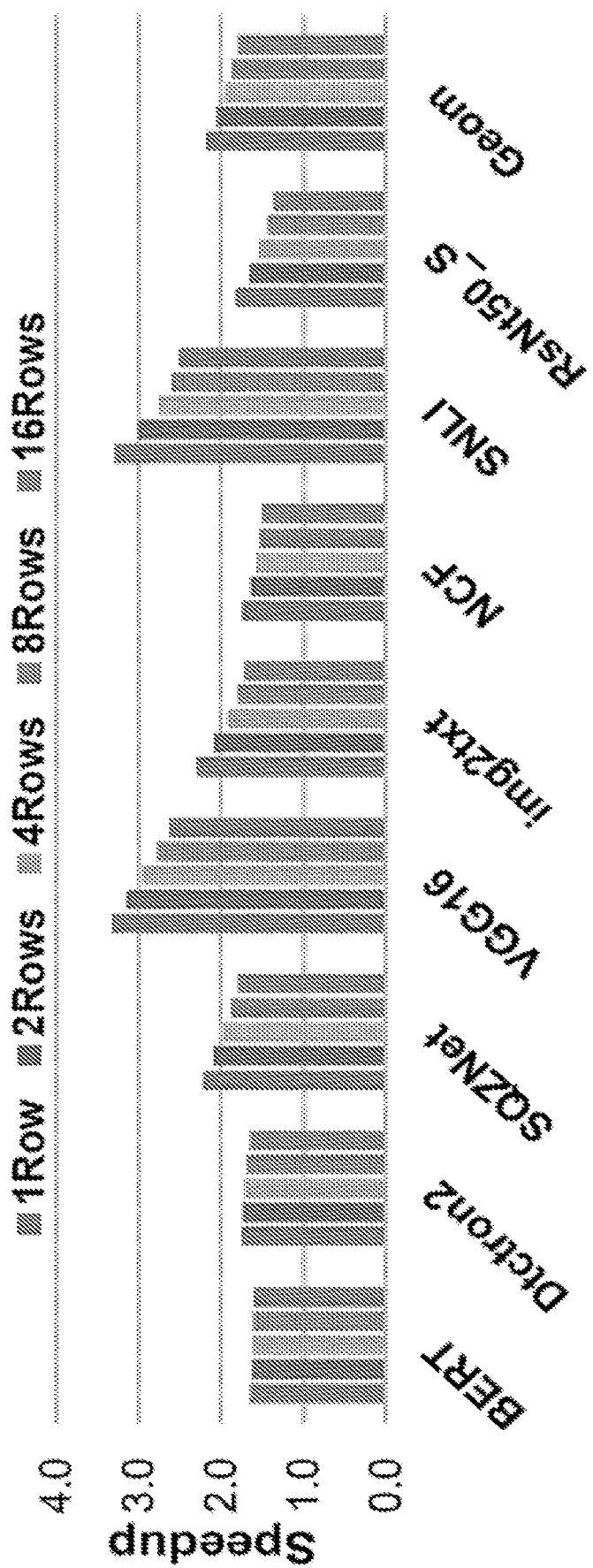
FIG. 18 shows the performance of the system of FIG. 1 changing as the number of rows per tile varies from 1 and up to 16 while the number of columns is fixed at 4.

Generally, the depth of the staging buffers can dictate a theoretical peak speedup since it limits the maximum number of time steps that can be skipped at once. For an N-deep buffer, the maximum speedup is N×. However, the hardware complexity of the scheduler and the corresponding front-end and backend shufflers may increase as the staging buffers get deeper. To study the effect of depth configurations, depths from 2 up to 5 were swept in the example experiments. The 2-deep and 3-deep configurations implement four possible promotions per lane, instead of eight for a more balanced implementation cost vs. performance. FIG. 18 illustrates that the average speedup grows from 1.5× (2-deep) to 2.05× (5-deep) with returns tapering off from 4-deep to 5-deep.

The example experiments studied the performance behavior of the PE when it was used to compose tiles. For this purpose, the number of PE rows and columns per tile were varied and how this affects performance was studied. As the tile geometry scales, stalls may occur due to inter-PE synchronization which in turn is caused by work imbalance.

FIG. 18 shows how the performance of the system 100 changes as the number of rows per tile varies from 1 and up to 16 while the number of columns is fixed at 4. The average speedup decreases from 2.2× for a tile with 1 row to 1.8× when the tile has 16 rows. Since all PEs have to wait for the slowest one, when there are more rows there will be more frequent stalls due to work imbalance occurring. As the number of rows per tile are scaled up, the data values that are concurrently processed exhibit density imbalance across rows. This can stall some rows since all have to wait for the row with the densest value stream. In effect, as the number of rows increases, it becomes less likely that scheduling such a large group of values will result in skipping the entire processing cycle and advancing to the next group. The main reason why this occurs is that the non-zero activations and gradients tend to cluster in certain 2D feature maps whereas the other 2D maps become more sparse. This clustering phenomenon is generally fundamental in such models, especially towards the deeper layers where each filter is trained to extract specific high level features. Generally, this phenomenon is more pronounced for A×G, the second backward convolution, where the 2D feature maps of the activations and the gradients are convolved.

The number of columns per Tensorcore were varied from 4 to 16, while the number of rows stayed at 4. Since sparsity was exploited only on one side, which is the rows side, increasing the number of columns did not affect performance as much compared to an equivalently scaled baseline. All rows still had to wait for the row with the densest stream. However, increasing the columns allowed processing of more windows in parallel in convolutional layers while sharing the same schedule along the rows. A negligible drop was noticed in the speedup of some models that did not exceed 3% and was predominantly due to fragmentation caused by layer dimensions.

Figure 19:
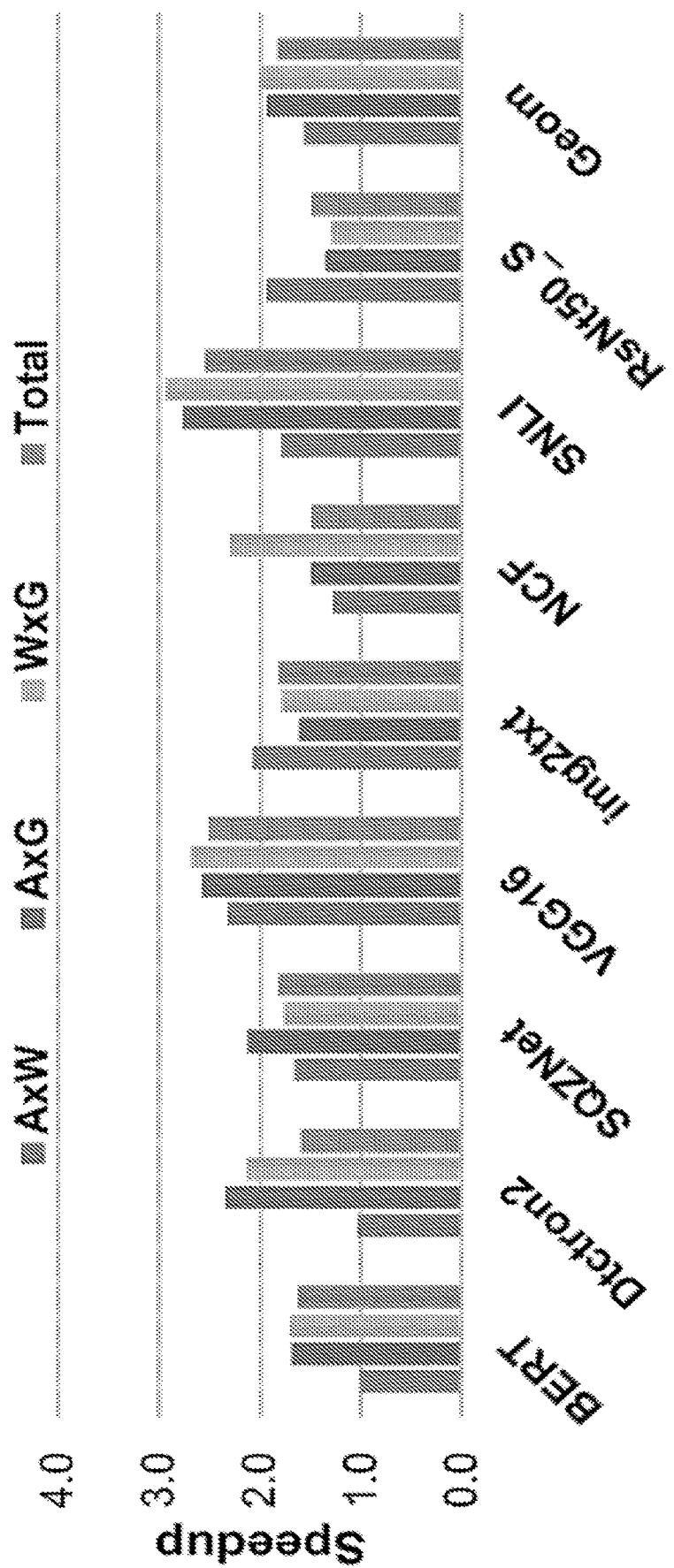
FIG. 19 shows average performance improvements for the system of FIG. 1 with 3-deep staging buffers on top of 16-wide processing elements.

The example experiments also experimented with wider Tensorcore configurations that had more multiplier lanes. A TensorDash design was studied that still allowed only 8 promotions per lane. It was found that a wider Tensorcore performs well even with shallower staging buffers and thus less hardware overhead. It achieved almost the same performance and energy efficiency as the narrow Tensorcore with 4-deep buffers. FIG. 19 shows that TensorDash with 3-deep staging buffers on top of 16-wide PEs improves performance on average by 1.85×. Meanwhile, the area overhead is reduced to 10% and 3.5% for the compute logic and the whole chip respectively. As a result of the specific sparse connectivity pattern used for this configuration, lanes with non-overlapping connectivity patterns could be grouped for scheduling in one level which permits a scheduler with just 6 levels and that is not in the critical path.

Figure 20:
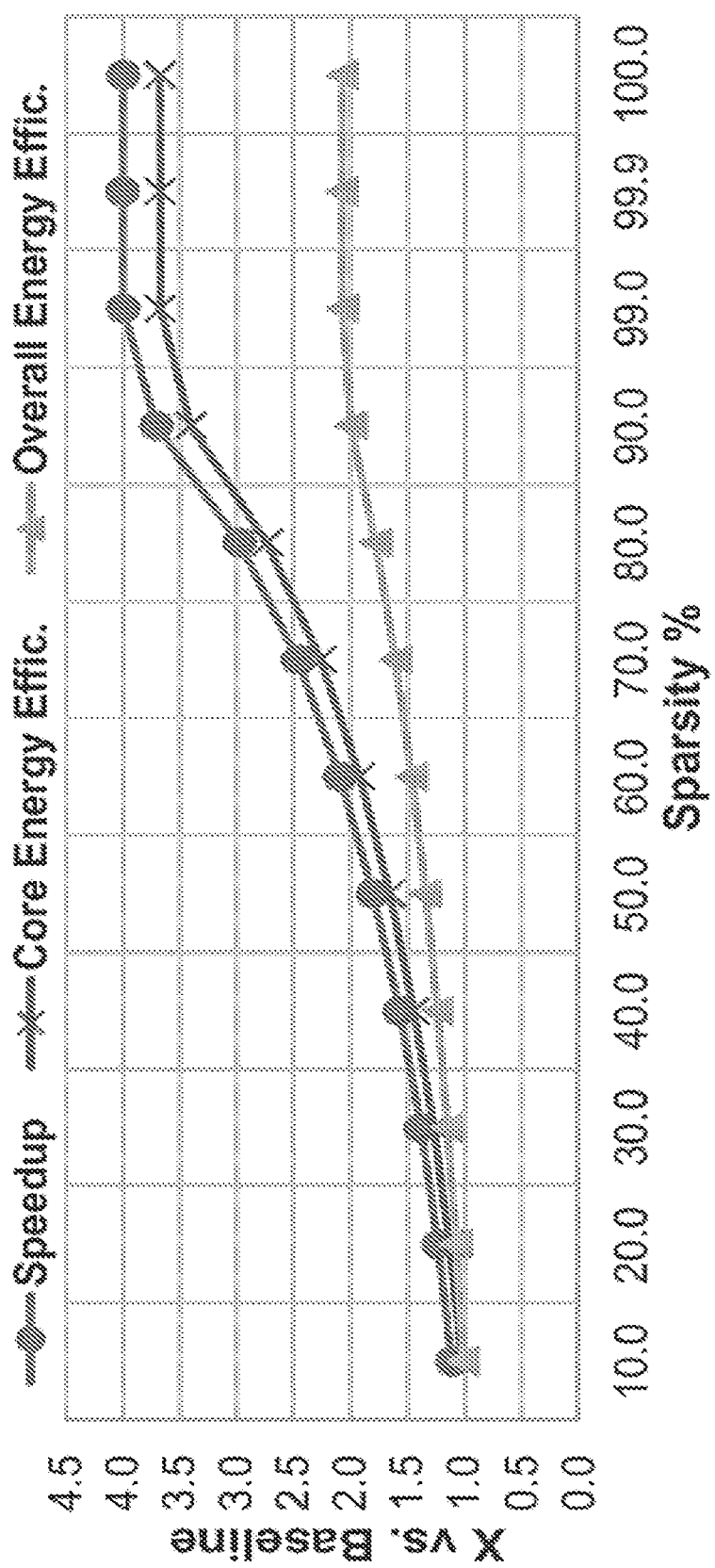
FIG. 20 shows speedup of the system of FIG. 1 for randomly sparse tensors.

To determine whether TensorDash remains effective regardless of the sparsity structure, the example experiments experimented with synthetically generated sparse tensors with sparsity levels ranging from 10% up to 99.9%. The architecture of the third convolution layer from SQZNet was used but populated the tensors using randomly generated values. For each level of sparsity, 10 tensor samples were generated. Then all three operations were performed for each sample using these generated tensors. The average across all samples for each sparsity level was determined (the maximum deviation in measured speed was below 5%). Recall that given the 4-deep staging buffers, the maximum possible speedup with TensorDash even if the tensor contains only zeros is 4×. As FIG. 20 shows, performance with TensorDash closely followed the amount of sparsity in the input. FIG. 20 shows that when the ideal speedup is below 4×, TensorDash comes close to what is ideally possible. For example, with 20% sparsity, an optimal machine would be 1.25× faster. TensorDash is approximately 1.23× faster. For 90% sparsity, an ideal machine would be 10× faster. The example experiments show that TensorDash comes close to its ideal 4× speedup being 3.7× faster and reaching to 3.99× for the 99% sparsity level.

It has been determined that deep neural networks could be trained using other floating-point data types such as bfloat16. The example experiments implemented TensorDash and baseline configurations that use bfloat16 arithmetic. Even when the experiments considered only the compute logic, synthesis and layout results showed that the area and power overheads of TensorDash remain low at 1.16× and 1.1× respectively. The various components scale differently as the data type changes. For example, while hardware overhead of the scheduler and shufflers did not change when it went from FP16 to bfloat16, the multipliers shrink. When the on-chip memory structures are taken into account, the area overhead is 4.9%. In terms of energy efficiency, the compute logic with TensorDash was on average 1.76× more energy efficient than the baseline. When accesses to the on-chip and the off-chip memory were taken into account, introducing TensorDash boosted overall energy efficiency by 1.48×.

The example experiments experimented with GCN, a natural language processing model which was trained on the Wikitext-2 dataset. It exhibited virtually no sparsity in the activations, gradients, and weights. Still, TensorDash improved performance by 1% since a few layers exhibit about 5% sparsity. TensorDash overall energy efficiency was 0.5% lower than the baseline.

The present embodiments advantageously provide a plug-and-play element that exploits dynamic sparsity and can be used to compose processing tiles. Generally, DNN training is needed in the datacenter and at the "edge". The present embodiments provide a low-level processing element that could be of value for building accelerators for either segment. While the present embodiments can interact with several approaches for accelerating training, it is at first-order complementary with many since it operates at the very low-level of the MAC units. It is believed that the present embodiments can be of value as a replacement PE for many existing hardware accelerators and in conjunction with software-level training acceleration techniques such as pruning.

The present embodiments advantageously provide a hardware-based technique that enables data-parallel MAC units to take advantage of sparsity in their input operand streams. When used to compose a hardware accelerator for deep learning, the present embodiments can speedup the training process while also increasing energy efficiency. In some cases, a low-cost sparse input operand interconnect is combined with an area-efficient hardware scheduler. The scheduler can effectively extract sparsity when it is present in the activations, the weights and the gradients. Over a wide set of state-of-the-art models covering various applications, the training process was evidenced to be accelerated by 1.95× while being 1.5× more energy efficient when incorporated on top of a Tensorcore-based accelerator at less than 5% area overhead. In most cases, the system 100 is datatype agnostic and this was demonstrated with Institute of Electrical and Electronics Engineers (IEEE) standard mixed-precision floating-point units and a machine learning-optimized brain floating-point format (BFloat16).

In an example, in addition to training acceleration, the present embodiments may be used for inference accelerators. Particularly, the hardware scheduler, described herein, can take advantage of dynamic sparsity in activations while performing a forward pass convolution between the activations and the weights. Thus, while the present disclosure focuses on the context of training acceleration, the present embodiments can also be used for inference acceleration by exploiting dynamic sparsity in activations and static sparsity in weights. In addition, while the present disclosure did not specifically describe pre-scheduling the input tensors in memory, it is possible to do so in order to further reduce memory footprint, traffic, and energy during training and inference. Prescheduled tensors can first be expanded from the pre-scheduled form to their corresponding "dense" form in the staging buffers. This can be implemented using a sparse interconnect that mirrors the interconnect described herein to select the effectual operands. For weights, the pre-scheduling can be performed in advance and, in some cases, in software for the case of inference. For activations and gradients, the pre-scheduling can be performed on the output of the preceding layer. Another hardware scheduler, identical to the one described herein, pre-schedules the values as they are produced at the output of a layer.

Although the invention has been described with reference to certain specific embodiments, various modifications thereof will be apparent to those skilled in the art without departing from the spirit and scope of the invention as outlined in the claims appended hereto.

The invention claimed is:

1. A method for using sparsity to accelerate deep learning networks for a processing element, the method comprising:
receiving and storing input tensors respectively from a plurality of input streams for subsequent multiply-accumulate (MAC) operations;
communicating, to a scheduler, bit vectors corresponding to the input tensors identifying which values in the input tensors are non-zero, and determining, based on the bit vectors, locations of non-zero values;
for each MAC operation, selecting, for each corresponding lane of the input tensors, one of the values of the input tensor to form a non-zero value pair and be communicated for the MAC operation, the selection of the non-zero values comprising one of:
the current value in the lane;
the next value in the same lane where such value is non-zero;
a value from a step ahead in time where such value is non-zero; and
a value from a neighboring lane where such value is non-zero;
communicating the selected values for the MAC operations; and
outputting the values of the MAC operations.

2. The method of claim 1, wherein the processing element is tiled together with a plurality of other processing elements, and receiving and storing the input tensors from the plurality of input streams comprises processing elements along a same row of the input streams share input and processing elements along a same column of the input streams share input.

3. The method of claim 2, wherein each processing unit of the plurality of processing units uses a separate scheduler.

4. The method of claim 1, wherein each processing unit along the same row uses a common scheduler.

5. The method of claim 1, wherein the lanes are treated as arranged in a ring where a last of the lanes is neighbouring a first of the lanes.

6. The method of claim 1, wherein communicating the value from the neighboring lane comprises communicating a value from a neighboring lane from a step ahead in time where such value is non-zero.

7. The method of claim 1, wherein receiving and storing the input tensors from the plurality of input streams comprises storing each of the input streams in a respective staging buffer.

8. The method of claim 7, wherein the staging buffer comprises a current step of the input stream and one or more steps ahead in time.

9. The method of claim 1, wherein the scheduler uses a hierarchical priority scheme.

10. The method of claim 9, wherein the hierarchical priority scheme comprises a dense schedule, followed by a plurality of steps increasingly ahead in time, and followed by a plurality of steps of neighbouring lanes increasingly ahead in time.

11. A system for using sparsity to accelerate deep learning networks, the system comprising one or more processing units in communication with data memory for executing processing elements (PEs), each processing element receiving a plurality of input streams and comprising:
staging buffers for receiving and storing input tensors respectively from the plurality of input streams for subsequent multiply-accumulate (MAC) operations;
a scheduler to receive a bit vector from each staging buffer to identify which values in a respective one of the input tensors are non-zero and to determine, based on the bit vectors, locations of non-zero values;
wherein, for each MAC operation, the scheduler selects, for each corresponding lane of the input tensors, one of the values of the input tensor to form a non-zero value pair and be communicated to a MAC a unit, the selection of the non-zero values comprising one of:
the current value in the lane;
the next value in the same lane where such value is non-zero;
a value from a step ahead in time where such value is non-zero; and a value from a neighboring lane where such value is non-zero; and performing and outputting the values of the MAC operations by the MAC unit using the selected values.

12. The system of claim 11, wherein the processing elements are collectively arranged in a tiled arrangement where processing elements along a same row of the input streams share input and processing elements along a same column of the input streams share input.

13. The system of claim 12, wherein each processing unit uses a separate scheduler.

14. The system of claim 11, wherein each processing unit along the same row uses a common scheduler.

15. The system of claim 11, wherein the lanes are treated as arranged in a ring where a last of the lanes is neighbouring a first of the lanes.

16. The system of claim 11, wherein communicating the value from the neighboring lane comprises communicating a value from a neighboring lane from a step ahead in time where such value is non-zero.

17. The system of claim 11, wherein the staging buffer comprises a current step of the input stream and one or more steps ahead in time.

18. The system of claim 11, wherein the scheduler uses a hierarchical priority scheme.

19. The system of claim 18, wherein the hierarchical priority scheme comprises a dense schedule, followed by a plurality of steps increasingly ahead in time, and followed by a plurality of steps of neighbouring lanes increasingly ahead in time.

20. The system of claim 11, wherein the scheduler receives two bit vectors from each of the staging buffers associated with values in each lane, the two bit vectors are bit-wise OR-ed to generate an output bit vector indicating where there is at least one zero, the scheduler, using the values in the output bit vector, selects a movement per lane so that as many of the non-zero values as possible are processed in a single step.

\* \* \* \* \*

UNITED STATES PATENT AND TRADEMARK OFFICE
CERTIFICATE OF CORRECTION

PATENT NO. : 12,182,621 B2
APPLICATION NO. : 18/005725
DATED : December 31, 2024
INVENTOR(S) : Mostafa Mahmoud and Andreas Moshovos Page 1 of 1

It is certified that error appears in the above-identified patent and that said Letters Patent is hereby corrected as shown below:

In the Claims

Claim 11, Column 22, Line 61:
"be communicated to a MAC a unit"
Should read:
"be communicated to a MAC unit"

Signed and Sealed this
Twelfth Day of August, 2025

Coke Morgan Stewart
*Acting Director of the United States Patent and Trademark Office*